(12) United States Patent
Little et al.

(10) Patent No.: US 9,215,238 B2
(45) Date of Patent: *Dec. 15, 2015

(54) SYSTEM AND METHOD FOR TRANSMITTING AND UTILIZING ATTACHMENTS

(71) Applicant: BLACKBERRY LIMITED, Waterloo (CA)

(72) Inventors: Herbert Anthony Little, Waterloo (CA); Albert Hecht-Enns, Waterloo (CA); David Francis Tapuska, Waterloo (CA); Michael Stephen Brown, Kitchener (CA); Michael Grant Kirkup, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/080,025

(22) Filed: Nov. 14, 2013

(65) Prior Publication Data

US 2014/0075191 A1 Mar. 13, 2014

Related U.S. Application Data

(63) Continuation of application No. 10/508,644, filed as application No. PCT/CA03/00405 on Mar. 20, 2003, now Pat. No. 8,615,661.

(60) Provisional application No. 60/365,532, filed on Mar. 20, 2002.

(51) Int. Cl.
*H04L 9/32* (2006.01)
*H04L 29/06* (2006.01)
*H04L 12/58* (2006.01)

(52) U.S. Cl.
CPC ............ *H04L 63/123* (2013.01); *H04L 12/583* (2013.01); *H04L 12/5895* (2013.01);
(Continued)

(58) Field of Classification Search
CPC ......... H04L 51/04; H04L 51/08; H04L 51/36; H04L 63/0428; H04L 9/3247
See application file for complete search history.

(56) References Cited

U.S. PATENT DOCUMENTS

| 5,647,002 A | 7/1997 | Brunson |
| 5,884,246 A | 3/1999 | Boucher |

(Continued)

FOREIGN PATENT DOCUMENTS

| EP | 0950969 | 10/1999 |
| WO | 02/13031 | 2/2002 |

OTHER PUBLICATIONS

European Patent Application No. 09172351.0, Office Action dated Aug. 26, 2013.

(Continued)

*Primary Examiner* — Fikremariam A Yalew
(74) *Attorney, Agent, or Firm* — Louis B. Allard; Borden Ladner Gervais LLP

(57) ABSTRACT

A method of handling cryptographic information in a communication comprising body elements and attachment elements to a mobile device includes the steps of determining if the communication includes an attachment element comprising cryptographic information and converting the attachment element into a body element upon determining that the communication includes an attachment element comprising cryptographic information.

19 Claims, 13 Drawing Sheets

(52) U.S. Cl.
CPC .............. *H04L51/063* (2013.01); *H04L 51/38* (2013.01); *H04L 63/0428* (2013.01); *H04L 63/0464* (2013.01); *H04L 63/08* (2013.01); *H04L 63/0823* (2013.01); *H04L 63/12* (2013.01)

(56) References Cited

U.S. PATENT DOCUMENTS

| | | | |
|---|---|---|---|
| 6,092,114 | A | 7/2000 | Shaffer |
| 6,205,432 | B1 | 3/2001 | Gabbard |
| 6,367,013 | B1 | 4/2002 | Bisbee |
| 6,438,585 | B2 | 8/2002 | Mousseau |
| 6,683,940 | B2 | 1/2004 | Contractor |
| 6,714,950 | B1 | 3/2004 | Ferguson |
| 6,728,378 | B2 | 4/2004 | Garib |
| 6,732,101 | B1 | 5/2004 | Cook |
| 7,096,355 | B1 | 8/2006 | Marvit |
| 7,117,210 | B2 | 10/2006 | DeSalvo |
| 7,162,635 | B2 | 1/2007 | Bisbee |
| 7,196,807 | B2 | 3/2007 | Goldstone |
| 7,305,545 | B2 | 12/2007 | Filipi-Martin |
| 7,328,245 | B1 | 2/2008 | Hull |
| 7,484,107 | B2 | 1/2009 | Forlenza |
| 2001/0002485 | A1 | 5/2001 | Bisbee |
| 2001/0005864 | A1 | 6/2001 | Mousseau |
| 2001/0034225 | A1 | 10/2001 | Gupte |
| 2002/0016818 | A1* | 2/2002 | Kirani et al. ............... 709/203 |
| 2002/0059144 | A1 | 5/2002 | Meffert |
| 2002/0078351 | A1 | 6/2002 | Garib |
| 2002/0087536 | A1 | 7/2002 | Ferguson |
| 2002/0120693 | A1 | 8/2002 | Rudd |
| 2002/0178353 | A1 | 11/2002 | Graham |
| 2003/0037261 | A1 | 2/2003 | Meffert |
| 2003/0044012 | A1 | 3/2003 | Eden |
| 2003/0050933 | A1 | 3/2003 | DeSalvo |
| 2003/0054810 | A1 | 3/2003 | Chen |
| 2003/0065941 | A1* | 4/2003 | Ballard et al. ............... 713/201 |
| 2003/0081791 | A1 | 5/2003 | Erickson |
| 2003/0093565 | A1* | 5/2003 | Berger et al. ............... 709/246 |
| 2003/0099334 | A1 | 5/2003 | Contractor |
| 2003/0126214 | A1 | 7/2003 | Oliszewski |
| 2003/0142364 | A1* | 7/2003 | Goldstone ............... 358/402 |
| 2003/0154371 | A1 | 8/2003 | Filipi-Martin |
| 2003/0208546 | A1 | 11/2003 | DeSalvo |
| 2004/0054886 | A1 | 3/2004 | Dickinson |
| 2004/0088585 | A1 | 5/2004 | Kaler |
| 2004/0133520 | A1 | 7/2004 | Callas |
| 2004/0165603 | A1 | 8/2004 | D'Angelo |
| 2005/0143136 | A1 | 6/2005 | Lev |
| 2005/0278448 | A1 | 12/2005 | Mazor |

OTHER PUBLICATIONS

Extended European Search Report issued on Dec. 4, 2009 in connection with European Application No. 09172351.0.
Technical White Paper BlackBerry Enterprise Edition (TM) for Microsoft (R) Exchange version 2.1, RIM Wireless Handhelds (TM), 2001 Research in Motion Limited, www.blackberry.net.
Technical White Paper BlackBerry(TM) Enterprise Server for Microsoft (R) Exchange version 2.1, 1997-2001 Research in Motion Limited, www.blackberry.net.
Technical White Paper BlackBerry(TM) Enterprise Server for Lotus(R) Domino (TM) version 2.0 with Service Pack 1a, 1997-2001 Research in Motion Limited, www.blackberry.net.
International Search Report for Application No. PCT/CA03/00405, dated of mailing Sep. 1, 2003—7 pgs.
Stallings, William: "Electronic Mail Security", Cryptography and Network Security: Principles and Practice, 1999 XP-002212123, pp. 355-397.
S. Dusse, P. Hoffman, B. Ramsdell, L. Lundblade, L. Repka: "RFC 2311-S/MIME Version 2 Message Specification", Mar. 1998, XP-002250130, pp. 1-37.
R. Troost, S. Dorner: "RFC 1806—Communicating Presentation Information in Internet Messages: The Content—Disposition Header", May 1995, XP-002250131, pp. 1-8.
U.S. Appl. No. 10/508,644, Notice of Allowance dated Aug. 14, 2013.

* cited by examiner

SYSTEM AND METHOD FOR TRANSMITTING AND UTILIZING ATTACHMENTS

BACKGROUND

1. Technical Field

The application generally describes a system and method for handling data in an electronic communication, and in particular the transmission and automatic utilization of a message attachment in an electronic message addressed to a mobile data communications device ("mobile device").

2. Description of the Related Art

Secure Multipurpose Internet Mail Extensions (S/MIME), Pretty Good Privacy™ (PGP), and OpenPGP are exemplary standards for secure e-mail messages. For a secure e-mail message, the sender of the e-mail message may sign the message, encrypt the message, or both sign and encrypt the message. When a cryptographic message having a cryptographic attachment is received, display of the cryptographic attachment may not be automatic, but instead may be contingent on further action by the user. On a desktop system, for example, the further action may require the association of an external tool for viewing the cryptographic attachment, or saving the attachment to disk as a file. However, these actions available to a desktop user may not be available to a mobile device user, as the mobile device may be capable of performing only limited actions.

Known systems and methods of transferring e-mail to a mobile device may also prevent cryptographic attachments from reaching the mobile device. Mobile devices often receive data over a wireless network, and these wireless networks often have attachment limiting devices that may strip attachments to prevent large attachments from overflowing the capacity of the wireless network.

SUMMARY

A method of handling cryptographic information in a communication comprising body elements and attachment elements to a mobile device includes the steps of determining if the communication includes an attachment element comprising cryptographic information and converting the attachment element into a body element upon determining that the communication includes an attachment element comprising cryptographic information.

A system for handling cryptographic information in a cryptographic attachment in a message addressed to a mobile device, the system comprising an inline generator operable to access the cryptographic information in the cryptographic attachment and generate inline cryptographic information from the cryptographic information in the cryptographic attachment and insert the inline cryptographic information into the body part of the message, wherein the generation of the inline cryptographic information facilitates transmission of the cryptographic information to the mobile device.

DETAILED DESCRIPTION

Figure 1:
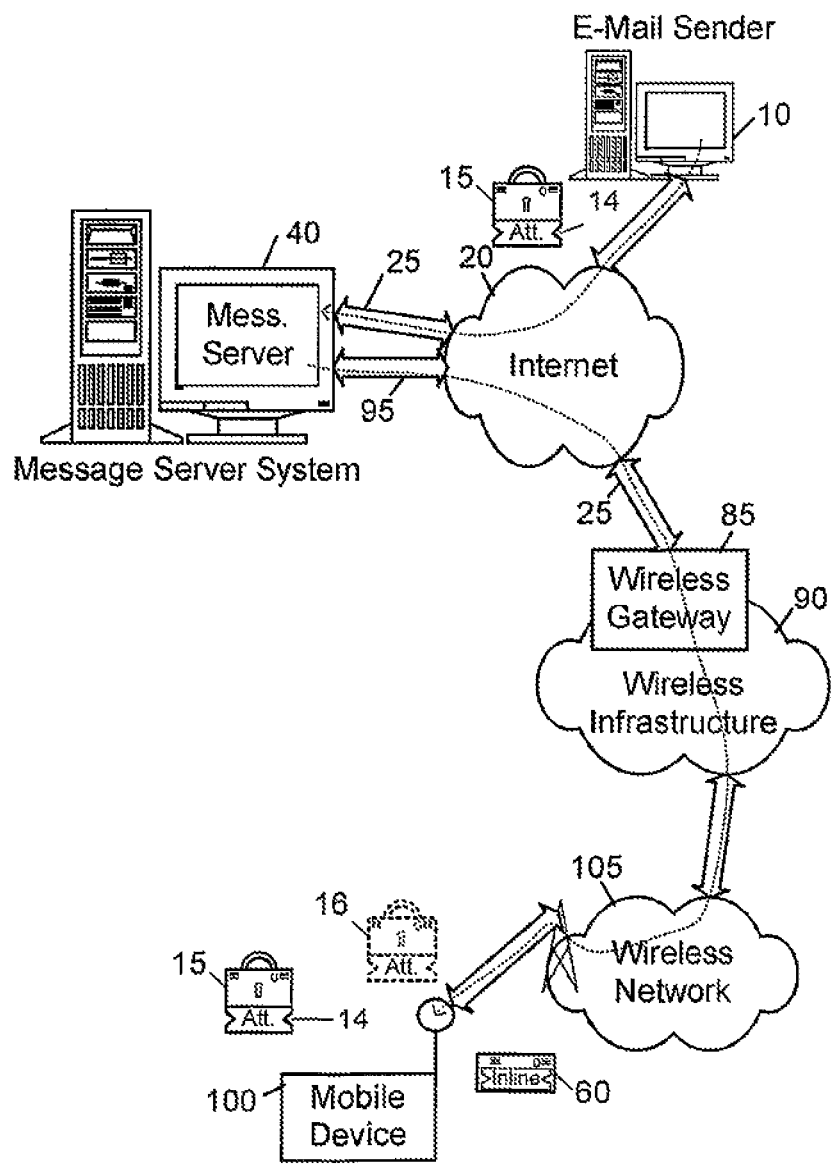
FIG. 1 is an overview of an example communication system in which a mobile device may be used.

The Internet Engineering Task Force (IETF) publishes detailed specifications relating to the Internet in general, and relating to Internet e-mail messages, Multipurpose Internet Mail Extensions (MIME), Secure Multipurpose Internet Mail Extensions (S/MIME), and other cryptographic standards and protocols such as Pretty Good Privacy (PGP). These detailed specifications are published as Requests For Comment (RFC) documents.

RFC 822, and subsequent RFCs thereto, specifies a header format for e-mail. An e-mail message consists of two parts: the header part and the body part. The header part forms a collection of structured field/value pairs.

If the header part of an e-mail message has a field which begins with "Content" and/or has a "MIME-Version" field, then the body of the message may be structured according to MIME, as specified in RFC 1521, and subsequent RFCs thereto. MIME thus specifies both an extension of e-mail message headers, and a corresponding structured body.

Furthermore, a MIME structured body can itself be structured using MIME, i.e., a body part can itself have a header part and a body part. Thus a MIME e-mail message is a hierarchical structure, rooted at the e-mail message, wherein some of the e-mail message header field/value pairs are also MIME header field/value pairs. Given the recursive nature of MIME, it is customary to refer to a MIME entity in descriptions that are equally applicable to a MIME entity such as a MIME e-mail message, and to a MIME body part, such as the body part of the MIME e-mail message. This convention will be used in this description.

A MIME entity may be structured as S/MIME, as specified in RFC 1847 and subsequent RFCs thereto. S/MIME governs cryptographic electronic messaging, including authentication, message integrity and non-repudiation of origin (using digital signatures), and privacy/data security (using encryption).

An S/MIME signed entity typically has a "content type" field whose value includes the tokens "multipart/signed," and a body that contains at least two parts: a first MIME entity part, and a second cryptographic information part. The cryptographic information part is typically used to verify that the MIME entity part has not been altered and/or that the sender of the S/MIME signed entity is known and/or trusted.

An S/MIME encrypted entity contains at least one cryptographic information part. The cryptographic information is typically used to decrypt the S/MIME encrypted entity, or for other security related operations. An S/MIME encrypted entity may have a "content type" field whose value includes the token "multipart/encrypted", and a body that contains at least two parts: a first part that contains cryptographic protocol specifying control information for the second part, and a second cryptographic information part.

An S/MIME entity can be produced by signing and encrypting operations. For example, an S/MIME entity can be alternatively signed, encrypted, signed and then encrypted, or encrypted and then signed. Thus, the use of the term S/MIME entity is meant to cover all of these possible entities having at least one cryptographic information part.

The cryptographic information part in an S/MIME entity typically has a content type field or a control information part that specifies the specific cryptographic protocol used. For example, S/MIME messages which use the cryptographic message syntax protocol for the cryptographic information part have a cryptographic information part with "content type" field having a value which includes one of the tokens "application/x-pkcs7-signature" or "application/x-pkcs7-mime", as specified in RFC 2311, and subsequent RFCs thereto. These tokens are used for S/MIME signed and S/MIME encrypted messages, respectively.

A multitude of specific cryptographic protocols can be used for cryptographic attachments in general, and S/MIME in particular. For example, in the case of PGP, as specified in RFC 2015, and subsequent RFCs thereto, a "content type" of "application/pgp-encrypted" and "application/pgp-signature" can be used to specify the cryptographic information part of an S/MIME PGP encrypted and S/MIME PGP signed entity, respectively. Furthermore, "application/pgp-keys" can be used to specify that the cryptographic information part of a PGP message includes PGP public keys. Thus, the term cryptographic information is used to cover all manner of information related to cryptographic operations.

The cryptographic information part in an S/MIME entity can be a MIME attachment, as is typical with known S/MIME techniques, such as those in use with Microsoft Outlook™, Microsoft Exchange™, Microsoft Outlook Express™, or other similar S/MIME e-mail techniques. According to RFC 2183, and subsequent RFCs thereto, MIME attachments are MIME entities that have a content disposition header field whose value includes the token "attachment" to indicate that the body part of the attachment is separate from the body part of a containing MIME entity, and that the display of the attachment should not be automatic, but rather contingent upon some further action of the user.

FIG. 1 is an overview of an example communication system in which a mobile device may be used There are many different topologies, and the simple system shown in FIG. 1 illustratively demonstrates one such topology in which the cryptographic attachment processing systems and methods described in the present application may be implemented. Other topologies may also be used, and there may also be additional message senders and recipients in addition to those depicted in FIG. 1.

FIG. 1 illustrates an e-mail sender 10, the Internet 20, a message server system 40, a wireless gateway 85, wireless infrastructure 90, a wireless network 105, and a mobile device 100.

An e-mail sender system 10 may be connected to an ISP (Internet Service Provider) on which a user of the system 10 has an account, or located within a company and connected to a local area network (LAN) that is connected to the Internet 20, or connected to the Internet 20 through a large ASP (application service provider) such as America Online (AOL). The systems shown in FIG. 1 may instead be connected to a wide area network (WAN) other than the Internet.

The message server 40 may be implemented on a network computer within the firewall of a corporation, a computer within an ISP or ASP system, or the like. The message server 40 can be, for example, an e-mail server. The mobile device 100 is configured for receiving and possibly sending e-mail and is associated with an account on a message server 40. Perhaps the two most common message servers are Microsoft Exchange™ and Lotus Domino™. These products are often used in conjunction with Internet mail routers that typically use UNIX-based Sendmail protocols to route and deliver mail. These intermediate components are not shown in FIG. 1, as they do not play a direct role in the cryptographic attachment processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105, collectively forming an exemplary e-mail transfer mechanism. The wireless infrastructure determines the most likely network for locating a given user and tracks the user as they roam between countries or wireless networks. A message is then delivered to the mobile device 100 via wireless transmission, typically at a radio frequency (RF), from a base station in the wireless network 105 to the mobile device 100. The particular network 105 may be virtually any wireless network over which messages may be exchanged with the mobile device 100.

As shown in FIG. 1, an e-mail message 15 having a cryptographic attachment 14 is sent by the e-mail sender 10 over the Internet 20. This message 15 is illustratively an S/MIME message having a cryptographic attachment 14, and uses traditional Simple Mail Transfer Protocol (SMTP), RFC822 headers and MIME body parts to define the format of the mail message 15 and the cryptographic attachment 14. The message 15 arrives to the message server 40 and is normally stored in a message store. Most known messaging systems support a so-called "pull" message access scheme, wherein the mobile device 100 must request that stored messages be forwarded by the message server 40 to the device 100. Other known systems provide for automatic routing of such messages which are addressed using a specific e-mail address associated with the mobile device 100. In one embodiment, a message server 40 account is associated with a host system, such as a home computer or office computer, which in turn is associated with the user of a mobile device 100. Messages directed to the message server 40 account are redirected from the message server 40 to the mobile device 100 as they are received. One such exemplary redirector system may be of the type disclosed in U.S. Pat. No. 6,219,694, entitled "SYSTEM AND METHOD FOR PUSHING INFORMATION FROM A HOST SYSTEM TO A MOBILE DATA COMMU- NICATION DEVICE HAVING A SHARED ELECTRONIC ADDRESS," the entire disclosure of which is incorporated herein by reference.

Regardless of the specific e-mail transfer mechanism controlling the forwarding of messages to a mobile device 100, the message 15, or possibly a translated or reformatted version thereof due to the stripping effect of an attachment limiting device, is sent to the wireless gateway 85. The wireless infrastructure 90 includes a series of connections to wireless network 105. These connections could be Integrated Services Digital Network (ISDN), Frame Relay, or T1 connections using the TCP/IP protocol used throughout the Internet.

As used herein, the term "wireless network" may cover many different types of wireless networks, such as (1) data-centric wireless networks, (2) voice-centric wireless networks and (3) dual-mode networks that can support both voice and data communications over the same physical base stations. The newest of these combined dual-mode networks include, but are not limited to (1) the Code Division Multiple Access (CDMA) network, (2) the Groupe Special Mobile or the Global System for Mobile Communications (GSM) and the General Packet Radio Service (GPRS) network both developed by the standards committee of CEPT, and (3) the future third-generation (3G) networks like Enhanced Data-rates for Global Evolution (EDGE) and Universal Mobile Telecommunications Systems (UMTS). GPRS is a data overlay on the very popular GSM wireless network, operating in virtually every country in Europe. Some older examples of data-centric network include the Mobitex™ Radio Network, and the DataTAC™ Radio Network. Examples of older voice-centric data networks include Personal Communication Systems (PCS) networks like CDMA, GSM, and TDMA systems that have been available in North America and worldwide for nearly 10 years. In addition to these illustrative wireless networks, other wireless networks may also be used.

The system shown in FIG. 1 illustrates three messaging cases; First, the case where a message 15 having a cryptographic attachment 14 is transmitted intact to the mobile device 100 is illustrated. In this case, the integrity of the message 15 is not certain, as an e-mail transfer mechanism in the network that is operable to transfer or redirect e-mail to the mobile device 100 may have an attachment limiting device which strips message attachments. The attachment limiting device may not be known to the user of the mobile device 100, and thus the user of the mobile device 100 may not be able to ascertain whether the message 15 originally included an attachment, or if an attachment has been stripped.

In the second case, a stripped message 16 is transmitted to the mobile device 100. At the mobile device 100, although message 15 was sent, stripped message 16 is received. The case where stripped message 16 is transmitted to mobile device 100 illustrates the integrity issue suggested in the first case, and also illustrates the case in which a service provider of the mobile device 100 strips attachments as a matter of course. The second case is further described in detail below with reference to FIG. 2.

Finally, in the third case, an inline cryptographic message 60 is transmitted to the mobile device 100, regardless of the presence or absence of an attachment limiting device in the system. The case where cryptographic inline message 60 is transferred to mobile device 100 is described in detail with reference to FIGS. 3-10 below.

Figure 2:
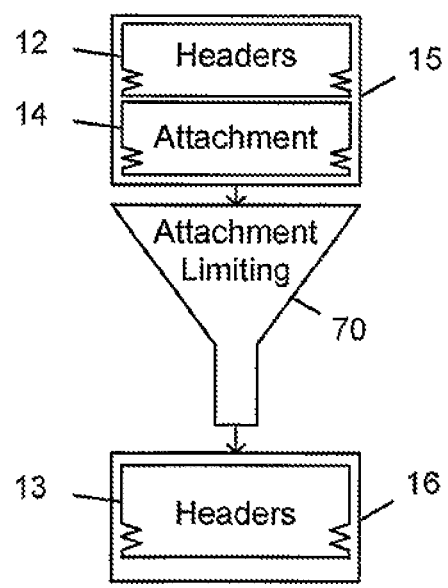
FIG. 2 illustrates an attachment limiting device that strips attachments from an e-mail message.

FIG. 2 illustrates an attachment limiting device 70 that strips attachments from an e-mail message 15. The message may be a message 15 in FIG. 1 in the case where a stripped message is received at the mobile device 100.

E-mail message 15 has at least a header part 12 and a cryptographic attachment 14. Headers 12 include known e-mail fields such as the "To:", "From:" and "Subject:" fields, as well as, when MIME and S/MIME protocols are used, other header fields. The attachment limiting device 70 transforms the e-mail message 15 into a stripped message 16, which no longer has attachment 14, and has headers 13 that differ at least from headers 12 by no longer referring to attachment 14. The attachment limiting device 70 may be implemented, for example, by using Messaging Application Programmer's Interface (MAPI) to construct the message 16 by requesting all message elements except for attachment 14 from the message server system 40 of FIG. 1. The e-mail message 15 may also be a multipart message, having other parts than just attachment 14, such as a plain text part. These other parts of message 15 go through attachment limiting device 70 unaltered as they are not attachments, and are transferred as parts of the message 16.

Figure 3:
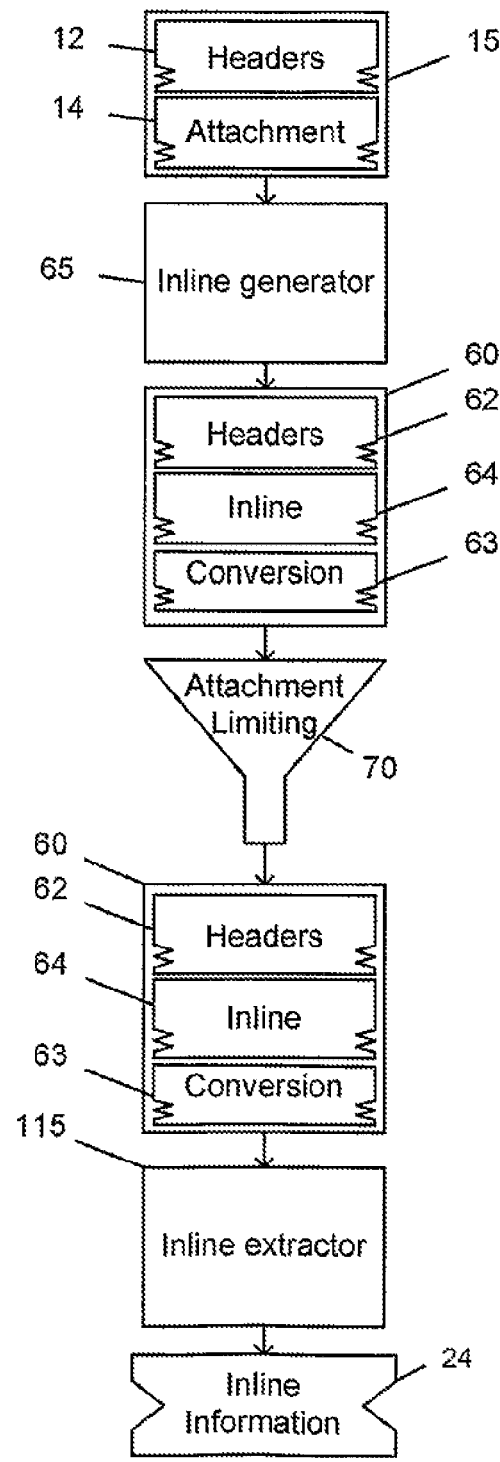
FIG. 3 illustrates an inline generator upstream from the attachment limiting device.

FIG. 3 illustrates in an inline generator 65 upstream from the attachment limiting device 70. The inline generator 65 generates an inline e-mail message 60. The inline e-mail message 60 is the inline message received at the mobile device 100 in the third case illustrated in FIG. 1.

The message 15 may have a cryptographic attachment, such as in the case of an S/MIME message. The information of the cryptographic attachment can be located within the body part of message 15 that immediately follows a header part having a "content disposition" header field/value pair that includes the token "attachment".

The specific type of cryptographic attachment in message 15 depends on the cryptographic protocol used. For example, if the cryptographic message syntax used is S/MIME, then the cryptographic attachment may have a "content disposition" field having a value which includes one of the "pkcs" variant protocol tokens: "application/x-pkcs7-signature", "application/x-pkcs7-mime", "application/pkcs7-signature", "application/pkcs7-mime", etc. Furthermore, in the absence of a specific protocol, the "filename" or "name" MIME parameter associated with the attachment can be used to determine the protocol used in the attachment. For example, the file name extension ".p7m" is associated with the S/MIME token "application/PKCS7-mime."

The inline generator 65 converts e-mail message 15 into inline cryptographic e-mail message 60, by extracting the cryptographic information from message 15, converting the cryptographic information into an inline form as a cryptographic inline entity 64, and communicating the inline entity 64 to the mobile device 100. This last step is accomplished, for example, by substituting message 15 with message 60 at the e-mail transfer mechanism. The attachment limiting device 70 will not strip the inline entity 64 since inline entity 64 is not an attachment. Headers 62 are substantially similar to headers 12, except that headers 62 specify that message 60 contains inline entity 64. This ensures that inline cryptographic e-mail message 60 that has in its body the cryptographic inline entity 64 retains the cryptographic information extracted from attachment 14, regardless of the effect of attachment limiting device 70.

Additionally, in another embodiment, the cryptographic inline e-mail message 60 can still have attachment 14 within its body, for example, by using the multipart construct of MIME. If e-mail message 15 has a multipart body, then the inline generator 65 can copy the body of message 15 into the body of message 60, and optionally include attachment 14, and then embed the inline entity 64 in the body of message 60.

In one embodiment, the inline generator 65 may delete the attachment 14 after creating the inline entity 64, and thus only one copy of the cryptographic information is sent to the mobile device 100 regardless of the presence or absence of attachment limiting device 70.

Many different methods are possible in the inline generator 65 to prevent the stripping of an attachment by an attachment limiting device 70. In one embodiment, headers 62 can be modified to not specify entity 64 as an attachment, and ensure that entity 64 is not discernible as an attachment.

In another embodiment, the headers 62 specify that entity 64 is an inline entity, thereby fully enabling the cryptographic information to be automatically used at the mobile device 100. This can be accomplished in a MIME system, for example, by including a "content disposition" field in headers 62 having a token value of "inline".

By including the extracted cryptographic information of attachment 14, the inline entity 64 may be smaller than attachment 14, since an attachment may also have to specify a "filename" parameter. Thus, bandwidth requirements are reduced.

The attachment limiting device 70, if present, operates substantially in the same way as was described in reference to FIG. 2 above. However, because the attachment 14 has been converted to an inline entity 64, the e-mail message 60 goes through the attachment limiting device 70 unchanged. Of course, if the inline generator 65 is configured to leave other, non-cryptographic attachments unchanged, then the attachment limiting device 70, if present, will strip these other attachments that the inline e-mail message 60 may still have. The inline generator 65, however, may also be configured to convert other non-cryptographic attachments to inline entities.

The attachment limiting device 70 may be implemented in the system either by design or due to external requirements. For example, the attachment limiting device 70 may be designed to be implemented at the inline generator 65, as described above, or at wireless gateway 85 of FIG. 1, or at another device in the communication system, such as a Proxy Server connected to wireless network 105. Alternatively, the attachment limiting device 70 may be implemented due to an external requirement, such as in the case in which the wireless network 105 and/or wireless infrastructure 90 may be a private network that strips attachments as a matter of course.

In another embodiment, the inline generator 65 may also generate conversion information 63 detailing the conversion of the attachment 14 into the inline entity 64. The conversion information 63 may then be accessed by an inline extractor 115 located in the mobile device 100 to reconstruct the original message 15 and the attachment 14. In one embodiment, the conversion information 63 comprises the original headers 12 of the original message 15 prior to processing by the inline generator 65.

Regardless of the presence of an attachment limiting device 70 in the system, the inline generator 65 and inline extractor 115 further provide the capability to automatically utilize the inline entity 64 at the mobile device 100. The inline extractor 115 receives the message 60 and extracts the cryptographic inline information 24 from inline e-mail message 60. Inline extractor 115 automatically extracts the cryptographic inline entity 64 from the message, and automatically extracts the inline cryptographic information 24 from the cryptographic inline entity 64. Because a body part having an inline disposition type is to be displayed or utilized automatically upon receiving the message 60, the mobile device 100 is thus enabled to automatically utilize the cryptographic information 24.

Non-cryptographic utilization of cryptographic information 24 may also be implemented. For example, the inline extractor 115 may be used to automatically reconstruct a message sufficiently similar to an original message 15 by fully reversing the process of inline generator 65 to generate a reconstructed attachment 14 from the inline cryptographic information 24. The inline extractor 115 may reconstruct the message 15 and the attachment 14 by accessing the conversion information 63 detailing the conversion of the attachment 14 into the inline entity 64. The automatically reconstructed message 15 and automatically reconstructed attachment 14 may, however, require further action by a user, as the information in the attachment 14 is no longer stored in an inline entity.

In another embodiment, instead of utilizing conversion information 63 to reconstruct the original message 15, the original message 15 is reconstructed by determining the type of information stored in the inline entity 64 and automatically generating an appropriate attachment file name and converting the inline entity 64 back into attachment 14. For example, in the case of an S/MIME communication, the file name extension ".p7m" is associated with the S/MIME token "application/PKCS7-mime." Thus, if an inline entity 64 is associated with the S/MIME token "application/PKCS7-mime," a file name having the extension ".p7m" may be automatically generated and the inline entity 64 may be converted back into an attachment 14 having the automatically generated file name.

Figure 4:
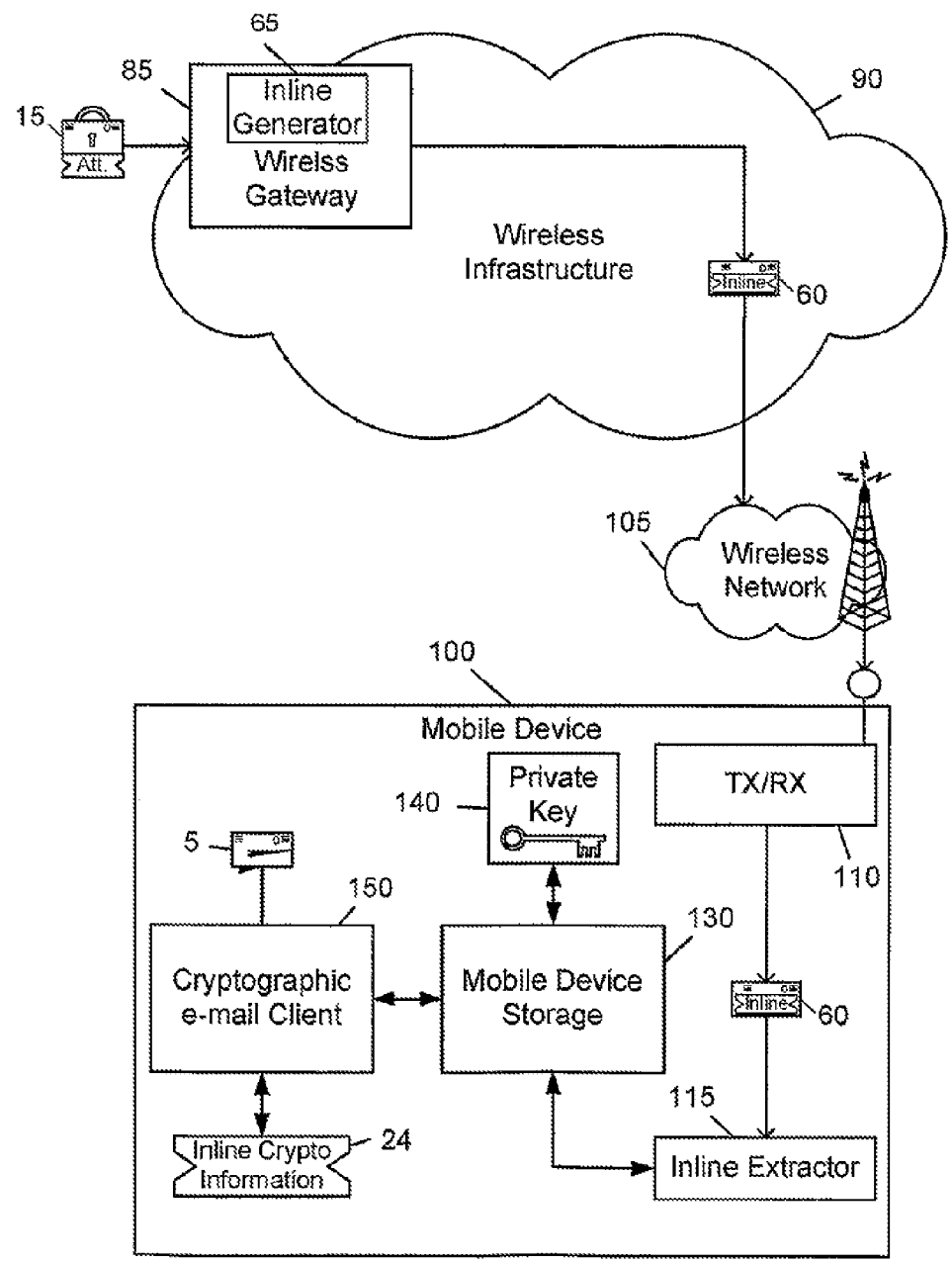
FIG. 4 shows in greater detail the elements of the example communication system of FIG. 1 in which the inline generator, attachment limiting device, and inline extractor of FIG. 3 have been integrated.

FIG. 4 shows in greater detail elements of the example communication system of FIG. 1 in which the inline generator 65, attachment limiting device 70, and inline extractor 115 of FIG. 3 are implemented. The inline generator 65 is illustratively implemented in the wireless infrastructure 90 of FIG. 4 and is integrated with wireless gateway 85 to receive the cryptographic e-mail message 15, convert the message 15 into cryptographic inline e-mail message 60, and provide the inline e-mail message 60 to the wireless network 105. Inline generator 65 preferably excludes the cryptographic attachment 14 of FIG. 3 from cryptographic inline e-mail message 60 after inserting the cryptographic information as an inline entity 54 to the message 60, thereby also providing the benefit of an attachment limiting device 70.

Mobile device 100 integrates the inline extractor 115 introduced in FIG. 3. A transceiver 110 at the mobile device 100 receives the cryptographic inline e-mail message 60 via wireless network 105, and provides the cryptographic inline e-mail message 60 to the inline extractor 115. By being located in the mobile device 100, inline extractor 115 enables cryptographic information 24 to be utilized automatically upon viewing of message 60 via a cryptographic e-mail client 150.

In another embodiment, the cryptographic inline e-mail message 60, or alternatively a reconstructed e-mail message 15 having an attachment 14, may be stored at the mobile device storage 130. In the case where cryptographic information 24 includes an encrypted and/or signed version of message 5, it is preferred not to store the automatically decrypted and/or unsigned message 5 in the clear. This ensures that although decrypting and/or verification are automatic, a message is never stored in the clear.

Since the cryptographic information 24 of cryptographic inline e-mail message 60 is made available automatically at the device 100, a cryptographic e-mail client 150 can automatically cryptographically. process the message 60. Examples of such automatic processing include checking for the presence of a digital signature in cryptographic inline information 24 of the message and/or applying a private key 140 to decrypt an encrypted session key, the session key being part of cryptographic inline information 24. The session key can in turn be used to decrypt an encrypted version of message 5, the encrypted version of message 5 also being part of the inline cryptographic information 24. Once signature verification and decryption operations, if necessary, are completed, automatically cryptographically processed clear message 5 can be shown to the user of the mobile device 100, along with cryptographic decryption and/or verification status information. Furthermore, clear message 5 can be automatically destroyed when no longer selected for viewing.

When sending a message from the mobile device 100, the inline extractor 115 may also perform the function of an inline generator 65, thus providing the ability to send cryptographic inline entities from the mobile device 100. Thus, both the sending of traditional attachments from the mobile device 100, as well as sending inline data from the mobile device 100, may be realized. In another embodiment, inline generator 65 may also perform the functions of the inline extractor 115, and is configured to complement operations of inline generator 65 functions carried out at the mobile device 100 to extract the inline data sent from mobile device 100 and provide a traditional attachment to the recipient of the message sent from the mobile device 100. Thus, if the wireless network 105 includes an attachment limiting device 70, an attachment may be sent from the mobile device 100 as an inline entity, and then converted to a traditional attachment by the inline generator 65 at the wireless gateway 85. The dual mode functionality of the inline generator 65 and the inline extractor 115 may be triggered such that attachments communicated to the mobile device 100 are converted to inline entities, and attachments communication from the mobile device 100 are converted to inline entities at the mobile device 100 before transmission, and thereafter converted to traditional attachments at the wireless gateway 85. Thus, by placing inline generators 65 and inline extractors 115 at various locations in communication networks of a communication system, the capability to "tunnel" attachments over one or more intermediate communication networks in the communication system is provided.

Figure 5:
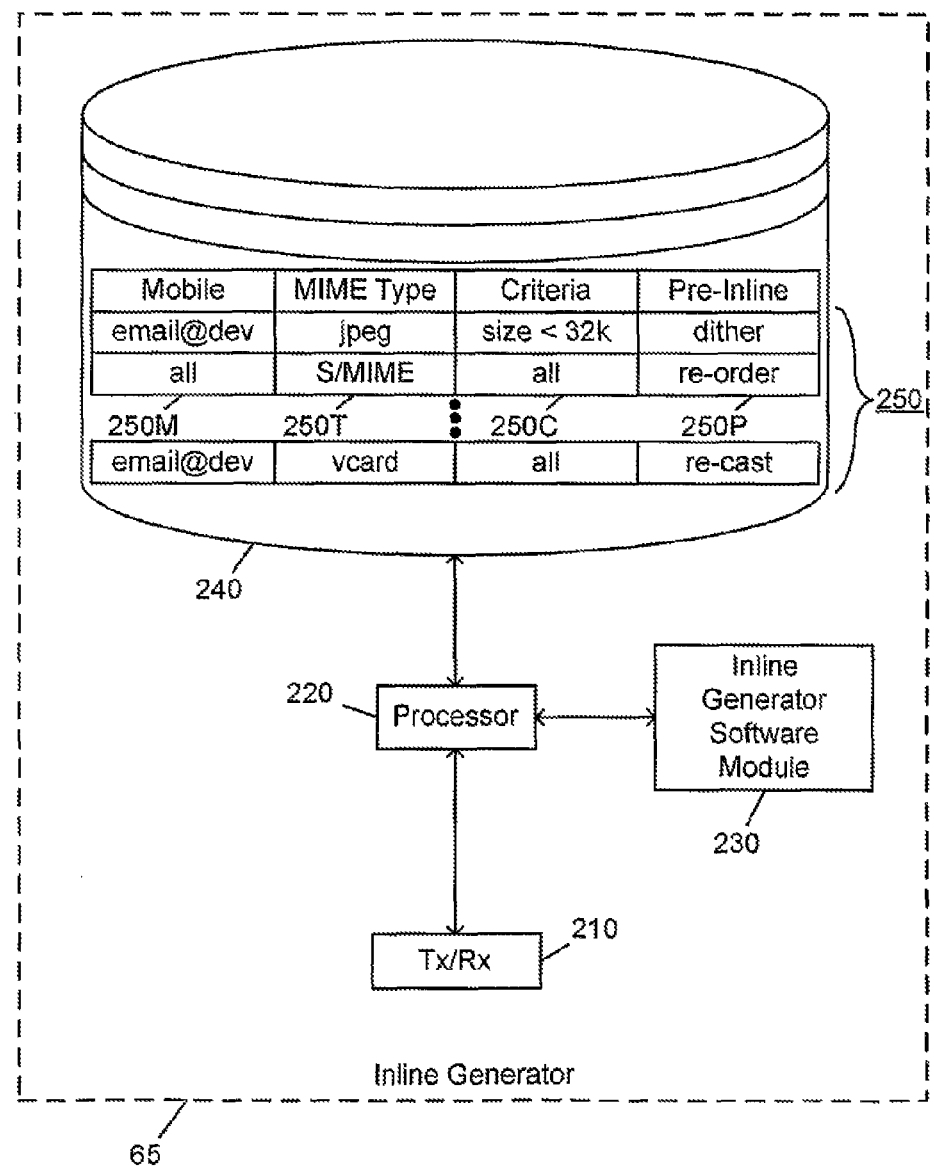
FIG. 5 shows in greater detail the exemplary inline generator of FIG. 4.

FIG. 5 shows in greater detail an exemplary inline generator 65. A transceiver 210, such as an Ethernet network interface card, is used to receive cryptographic e-mail message 15, and to transmit cryptographic inline e-mail message 60. Transceiver 210 can also be used for receiving optional configuration instructions, for instance regarding the optional stripping of attachments. Processor 220 processes the program instructions found in an inline generator software module 230, and communicates with transceiver 210, as well as with optional storage 240. Storage 240 has an optional MIME inline extractor table 250. Each row of the table 250 represents a rule and includes a mobile device e-mail Address 250M or similar means of identifying at least one mobile device, a MIME type 250T, as well as optional criteria 250C and optional pre-inline processing operations 250P. An exemplary method that may be implemented with these system components is described in further detail below with reference to FIG. 7.

The inline generator 65 can be located in any number of different system components. In alternate embodiments, the inline generator 65 can be located in a server that communicates with an e-mail transfer mechanism, such as the elements connected to message server 40 of FIG. 1, in the e-mail sender 10, in the same component as the attachment limiting device 70 of FIG. 3, in the wireless network 105, in the wireless infrastructure 90, or in the wireless gateway 85.

Figure 6:
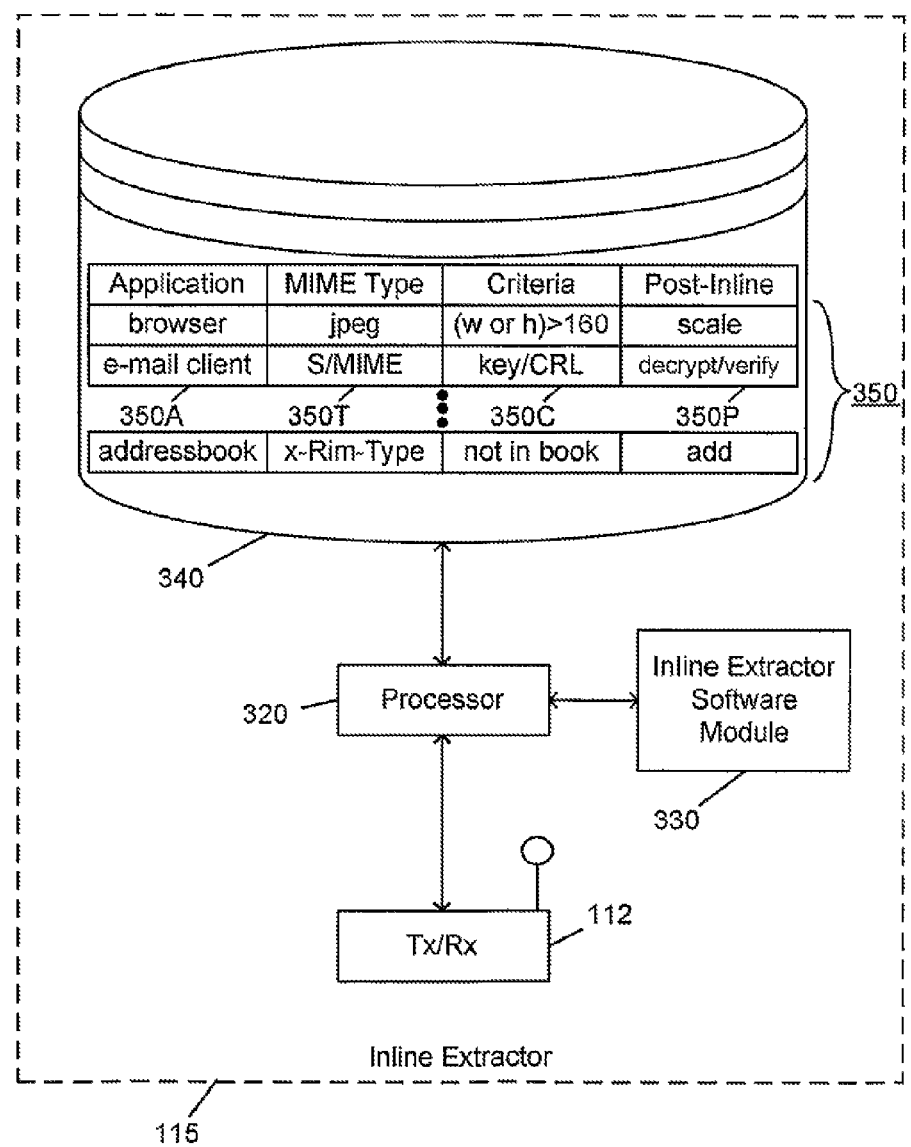
FIG. 6 shows in greater detail the exemplary inline extractor of FIG. 4.

FIG. 6 shows in greater detail the inline extractor 115 of FIG. 4. A transceiver 112, such as the wireless transceiver 110 of FIG. 4, is used to receive cryptographic inline e-mail message 60. Transceiver 112 may optionally be used to transmit inline generator configuration instructions, if the inline generator is so enabled, for example, to enable or disable inline operation and/or attachment stripping on a per MIME type basis. Processor 320 processes the instructions in inline extractor software module 330, communicates with transceiver 112, as well as with storage 340. Storage 340 may be such as the mobile data storage 130 of FIG. 4.

Storage 340 optionally has inline extractor configuration table 350. Each row of the table 350 represents a rule and includes an application 350A or other device module reference to be signaled upon conversion of an inline entity, such as cryptographic inline entity 64, a MIME type 350T, as well as optional criteria 350C and optional post-inline processing operations 350P. An exemplary method that may be used with these system components is described in further detail below with reference to FIG. 8. The inline extractor 115 is preferably located in the mobile device 100.

Figure 7:
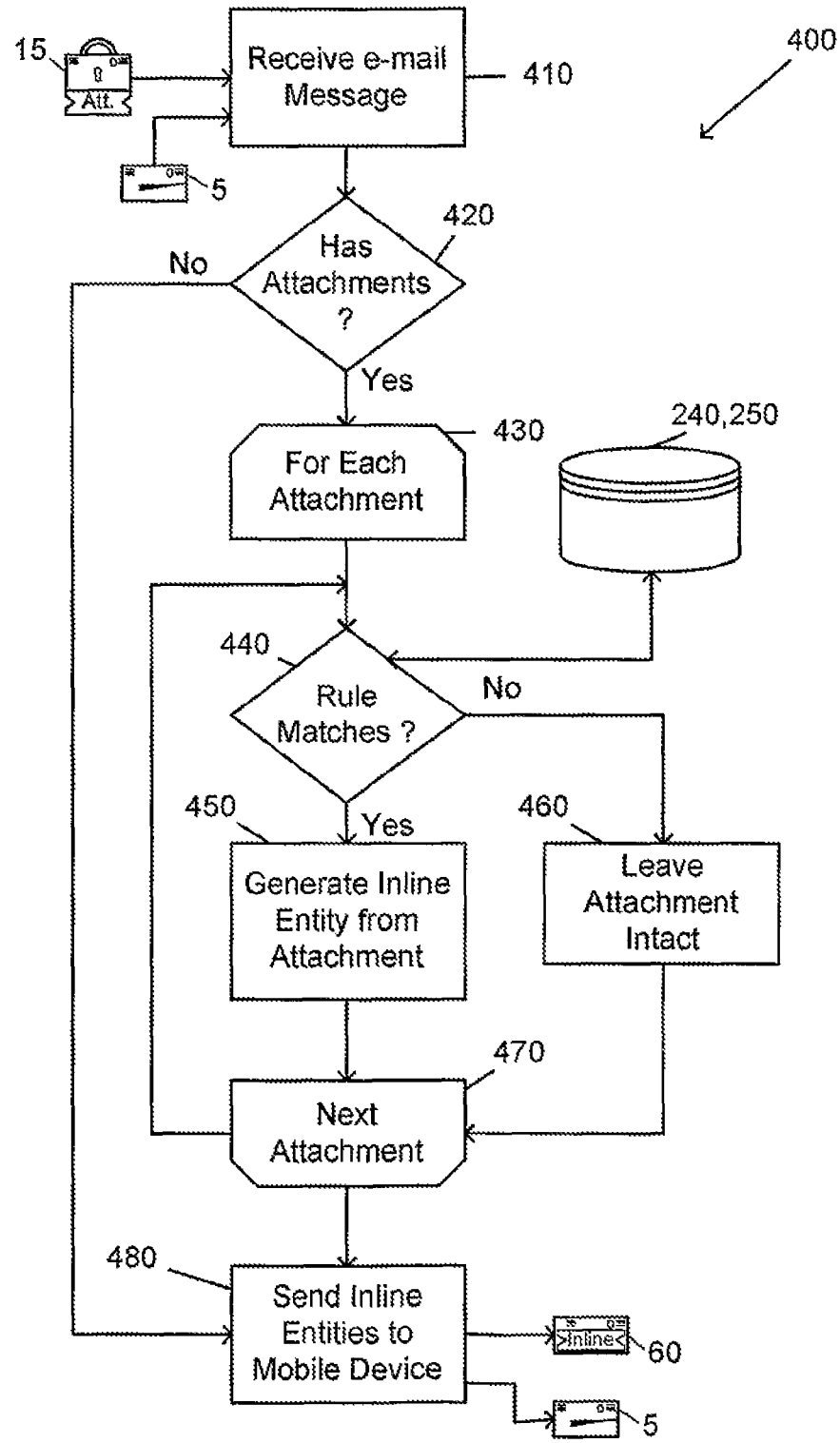
FIG. 7 is a flowchart illustrating an exemplary embodiment of a method of enabling cryptographic information to be utilized automatically at a mobile device.

FIG. 7 is a flowchart illustrating an exemplary method of enabling cryptographic information to be utilized automatically at a mobile device 100.

At step 410, an e-mail message, such as S/MIME e-mail Message 15, or e-mail message 5, is received. The step of receiving may encompass an e-mail message being retrieved from storage, for instance after being marked as unread, or an e-mail message being received at a message server, such as message server 40.

At step 420, it is determined whether the e-mail message received at step 410 has attachments. This can be accomplished using MAPI, or by inspecting the structure of the e-mail message, as previously described. If the e-mail message has attachments, for example, in the case of cryptographic e-mail message 15, then steps 430 to 470 ensue to generate an inline entity from the e-mail message, followed by step 480. Conversely, if the e-mail message does not have attachments, for example, in the case of e-mail message 5, then only step 480 ensues.

At step 430, each attachment in the e-mail message is processed through step 440, and depending on the outcome of step 440, either step 450 or step 460.

At step 440, storage 240 is consulted in order to determine if configuration table 250 stores a rule that matches for the attachment currently being processed. Each rule specifies a conversion condition upon which being met the attachment is converted to an inline entity. In one embodiment, a default rule is defined for cryptographic attachments and configuration table 250 and storage 240 need not be consulted. Illustratively, a default rule for S/MIME is defined by elements 250M and 250T of FIG. 5. These elements comprise a rule which can be interpreted as: regardless of the recipient 250M of the e-mail message, whenever an S/MIME type 250T attachment is found, the inline generator software module 230 embeds the attachment in the lines of the body of the resulting e-mail message.

Optionally, additional operations can occur. For instance, criteria 250C may be used to determine if the attachment meets pre-inline conditions to be embedded in the lines of the body. If the condition 250C is met, then pre-inline operations 250P, if any, may be desired to adapt the information that is derived from the message or attachment that is actually sent as an inline entity. For example, in the case of S/MIME type 250T attachments, the criteria 250C can be "all", indicating that all S/MIME attachments should be embedded in the lines of the body.

Furthermore, a re-ordering pre-inline operation 250P can adapt the cryptographic information in the S/MIME attachment so that optional components of the cryptographic attachment appear at the end. Such re-ordering and pre-inline operations are disclosed in U.S. Provisional Application Ser. No. 60/297,681, filed on Jun. 12, 2001, the disclosure of which is incorporated herein by reference.

Operations can also be utilized with other attachment types. For example, as illustrated in FIG. 5, the first rule in the first row of table 250 indicates that the recipient is email@dev, the MIME type is jpeg, the criteria is "size<32k", and a pre-inline operation of "dithering" the jpeg image contained in the attachment. Thus, if a jpeg attachment that is greater than or equal to 32 kilobytes is received, then it is not embedded into the lines of the body. However, if a jpeg attachment which is less than 32 kilobytes is received, then it is dithered, i.e., turned into a black and white image, before it is embedded into the lines of the body to adapt the image to be displayed on a black and white screen.

Another example of a pre-inline operation is the "re-casting" of an attachment into an alternate data type or MIME type that is more readily useable at the mobile device 100. For example, by recasting a "vcard" attachment type into an address book entry type, the mobile device 100 need not convert the vcard attachment into an address book entry.

Another example of recasting is providing a subset of attachment data. For example, if the original attachment is a digital certificate, the message server 40 may be configured to verify the authenticity of the digital certificate. If the authenticity is verified, then the resulting inline entity may only comprise the public key of the digital certificate, or the status of the digital certificate, for example, and the remaining digital certificate data need not be transferred.

If a rule or condition is met in step 440, then at step 450 the attachment is converted into an inline entity and embedded into the body of the e-mail message.

Conversely, if a rule or condition is not met in step 440, then at step 460 the attachment is left intact, or optionally stripped to conserve bandwidth over the wireless network 90 and resources at the mobile device 100.

At step 470, the next attachment, if any, is processed through steps 440 to 470. However, if all attachments have been processed, then step 480 ensues.

At step 480, the processed e-mail message is sent to the mobile device 100. At this step, the original attachments can be optionally removed from the e-mail message, thereby providing the above mentioned bandwidth conservation benefit of the attachment limiting device.

At the end of the process, after step 480, there is provided a cryptographic inline e-mail message 60 converted from the received cryptographic e-mail message 15. In the case of e-mail message 5 being received without attachments at step 410, e-mail message 5 continues as if unprocessed and is provided after step 480. This ensures that if a cryptographic inline message 60 or a regular e-mail message is received without attachments at step 410, the message is not altered. Thus, the process of FIG. 7 may be carried out simultaneously at multiple locations in the system, as processed messages are not affected by further execution of steps 410-480. These additional locations may include the wireless infrastructure 90, the wireless gateway 85, and other locations.

Figure 8:
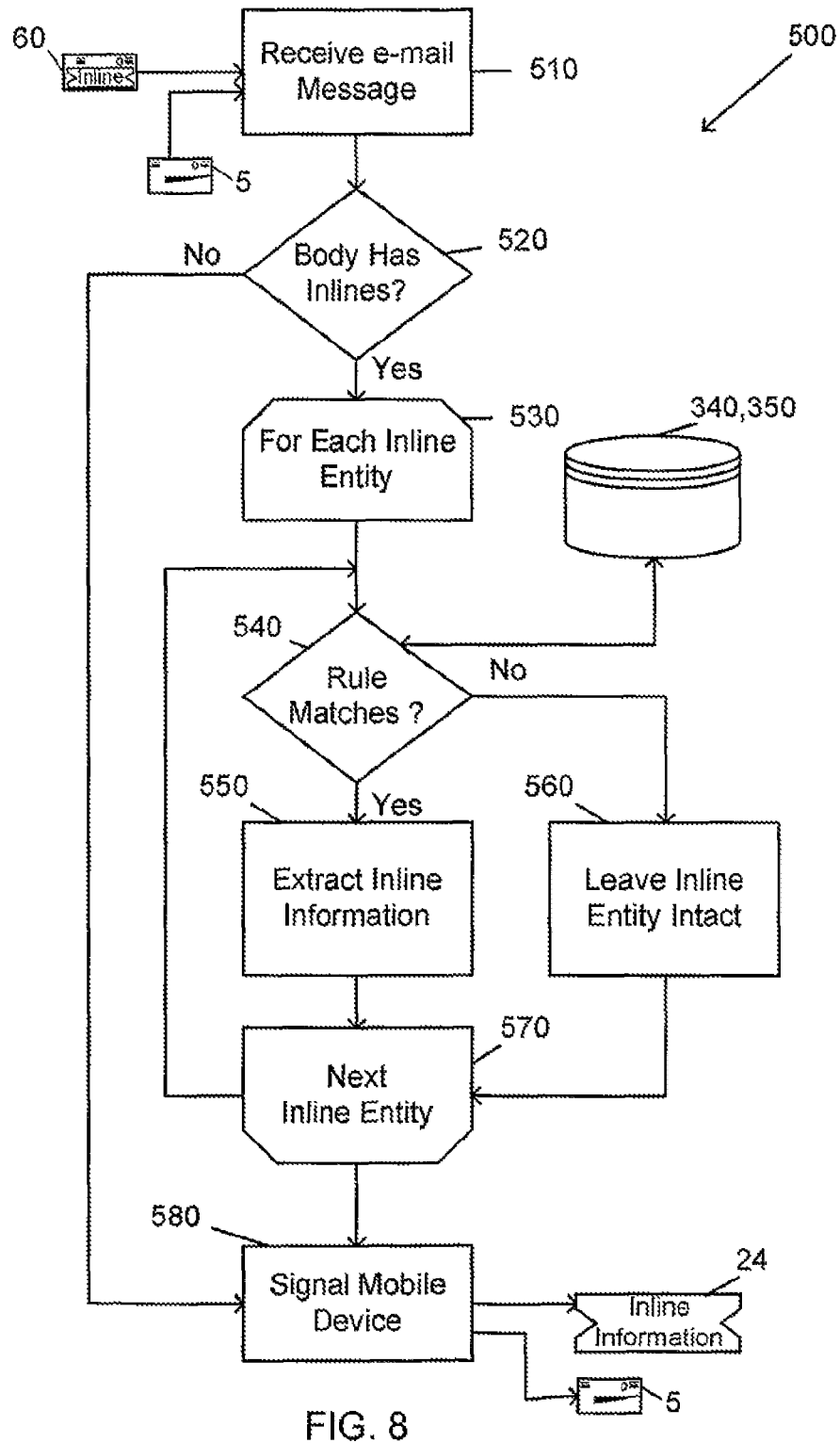
FIG. 8 is a flowchart illustrating an exemplary embodiment of a method of automatically utilizing cryptographic information at a mobile device.

FIG. 8 provides a flowchart illustrating an exemplary embodiment of a method of automatically using cryptographic information at a mobile device 100.

At step 510, an e-mail message, such as cryptographic inline message 60, or e-mail message 5, is received. The step of receiving can be realized by either receiving a message over the wireless network 105, or by retrieving a message from a data store in the mobile device 100.

At step 520, it is determined whether the e-mail message received at step 510 has a body with inline entities. In one embodiment, the determination is made by inspecting the structure of the e-mail message. If the e-mail message has inline entities, for example, in the case of cryptographic inline e-mail message 60 having cryptographic inline entity 64 of FIG. 3, then steps 530 to 570 ensue to convert the e-mail message, followed by step 580. Conversely, if the e-mail message does not have inline entities, for example, in the case of e-mail message 5, or a message with a traditional attachment but without any inline entities, then only step 580 ensues.

At step 530, each inline entity of the e-mail message is processed through step 540, and depending on the outcome of step 540, either at step 550 or step 560.

At step 540, storage 340 is consulted in order to determine if configuration table 350 contains a rule that matches for the inline entity of the e-mail message currently being processed. Each rule specifies an extraction condition upon which being met the information stored in the inline entity is extracted. In one embodiment, a default rule is defined for cryptographic attachments and configuration table 350 and storage 340 need not be consulted. The default rule is illustrated for S/MIME by elements 350A and 350T of FIG. 6, which can be interpreted as: whenever an S/MIME type 350T inline entity is found, the inline extractor software module 330 extracts the cryptographic information from the inline entity to automatically provide the cryptographic information found therein.

Optionally, additional operations can occur. For example, criteria 350C may be used to determine if the inline entity, once extracted from the message, meets post-inline processing conditions and should therefore be post-inline processed. Additionally, optional post-inline processing operations, if any, are specified. In the case of S/MIME compatible MIME type 350T, the criteria 350C can be, for example, "key/CRL", and post-inline operations 350P "decrypt/verify" indicating that the presence of an S/MIME Private Key 40 of FIG. 4 is a pre-condition for automatic decryption of the inline entity, and that the presence of a certificate revocation list (CRL) is a pre-condition for verification of the integrity of a digital signature certificate and/or the message. Thus, in the case of S/MIME type 350T, decryption and verification "decrypt/verify" 350P of a digital signature of the S/MIME message using the CRL can take place.

An example of how these optional operations can be utilized with cryptographic and non-cryptographic attachments is illustrated in FIG. 6. For example, assume a mobile device 100 has a display screen of 160 by 160 pixels. The first rule in the first row of table 350 indicates that the application is "browser", the MIME type is jpeg, and the criteria is "(w or h)>160 pixels", with the post-inline operation of scaling the image. Thus, if a jpeg image is the inline information in the inline entity and has a height or width less than 160 pixels, no post-inline processing is necessary. However, if a jpeg image has a height or width greater than 160 pixels, then it is scaled, i.e., adapted to the display of the mobile device 100.

Another example of a post-inline operation is the adding of inline information into a record system or data store readily useable at the mobile device 100. For example, by receiving an address book entry as an inline entity, an address book application on the mobile device 100 can automatically add the entry if it is not already in the address book. By way of another example, receiving a compressed file as an inline entity, a decompression program on the mobile device 100 can be configured to automatically decompress the compressed file contained in the inline entity.

If a rule or condition is met in step 540, then at step 550, the inline information in the inline body portion is extracted from the body of the e-mail message.

Conversely, if a rule or condition is not met in step 540, then at step 560 the inline entity is left intact.

At step 570, the next inline entity of the received e-mail message, if any, is processed through steps 540 to 570. However, if all inline entities have been processed, then step 580 ensues.

At step 580, reception of the e-mail message is signaled to the mobile device after the automatic inline processing.

At the end of the process after step 580, there is provided inline cryptographic information 24 in the case of a cryptographic inline message 60 being received at step 510. In the case of e-mail 5 being received without inline entities at step 510, e-mail 5 is unprocessed and is provided after step 580.

In another embodiment, the inline information 24 is automatically utilized at the mobile device 100 upon receiving the message or retrieving the message. In yet another embodiment, the mobile device 100 requires a user intervention before the inline information may be used.

While the systems and methods disclosed herein have been described primarily with reference to known communication protocols, such as MIME and S/MIME, the systems and methods may also be used with other communication protocols that differentiate between a body element of a message and an attachment element of a message. If a message comprises body elements and attachment elements, then an exemplary method includes the steps of determining if the communication includes a cryptographic attachment element comprising cryptographic information, and converting the cryptographic attachment element into a cryptographic body element upon determining that the communication includes a cryptographic attachment element. Thus, the systems and methods disclosed herein are not necessarily limited to MIME and S/MIME type communication systems.

Figure 9:
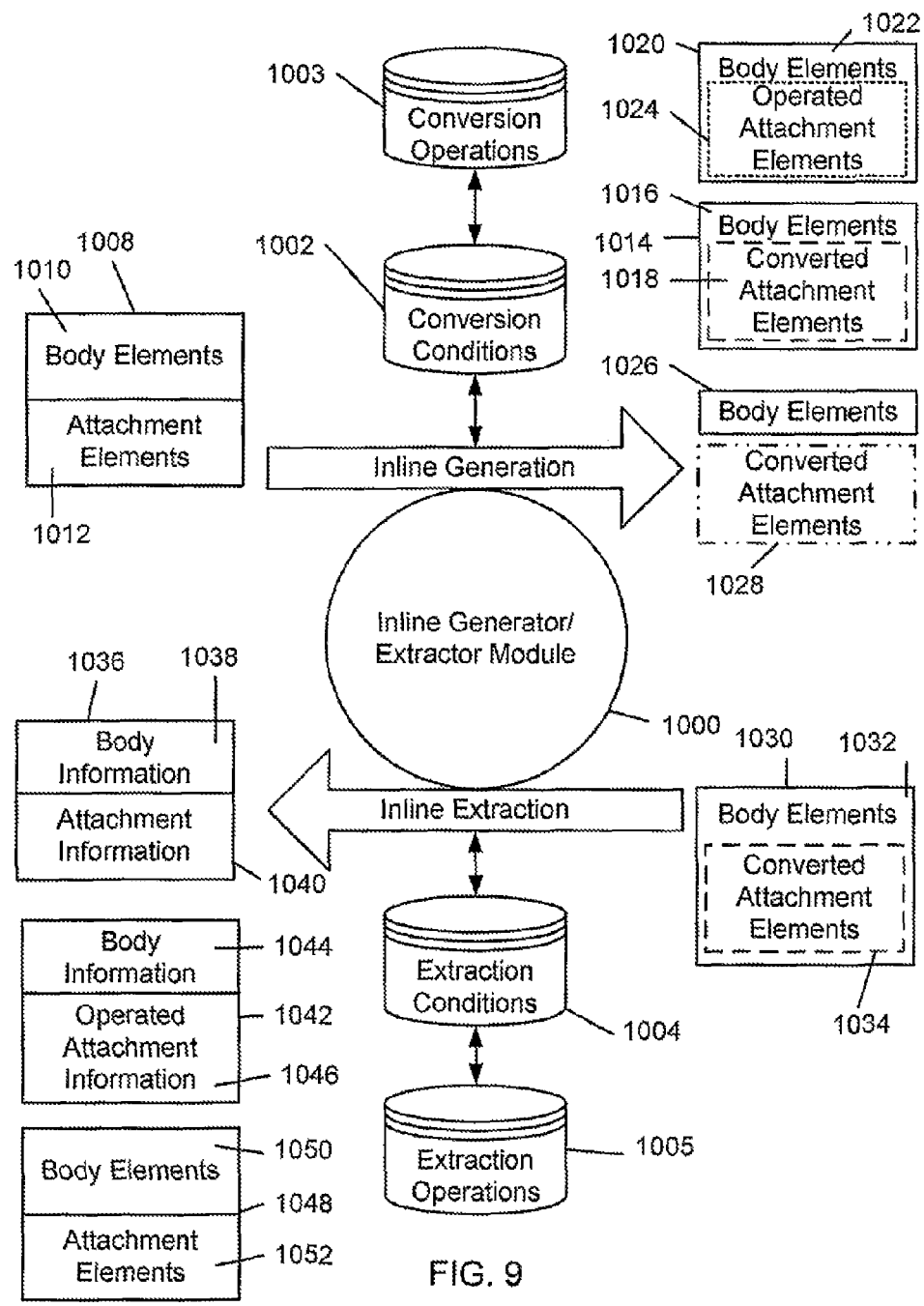
FIG. 9 is a block diagram illustrating an inline generator/extractor module.

Furthermore, the functionality of the inline generator 65 and inline extractor 115 may be combined in a single inline generator/extractor module 1000, as shown in FIG. 9. Software modules performing the function of the inline generator/extractor module 1000 may be located and executed at various locations in a communication network. Thus, in a similar manner as described above, the dual mode functionality of the inline generator/extractor module 1000 may be triggered in a manner such that attachments communicated to the mobile device 100 from a transmitting device, such as another mobile device 100, a wireless gateway 85, or a message server 40, as shown in FIG. 1, are converted to inline entities before being transmitted over the wireless network 105. Similarly, attachments sent from the mobile device 100 to a recipient are converted to inline entities at the mobile device 100 before being transmitted over the wireless network 105. Once the transmission is received by either the recipient device, such as another mobile device 100 or a message server 40, or an intermediate device, such as the wireless gateway 85, the inline entities may be converted back into an attachment entity by another inline generator/extractor module executed on the recipient device or intermediate device. Thus, multiple inline generator/extractor modules 1000 located in various communication networks in a communication system can provide the capability to "tunnel" attachments over one or more intermediate communication networks in the communication system.

The inline generator/extractor module 1000 illustratively comprises software operable to monitor outgoing and incoming communications to the device upon which it is executed, and further comprises a data store storing a table of conversion conditions 1002 and conversion operations 1003. The substance of an outgoing communication is monitored in a similar manner as described with reference to FIGS. 5 and 7 above. Thus, if a conversion condition 1002 is met, then an outgoing mixed element communication 1008, comprising body elements 1010 and attachment elements 1012 may be converted into a body element communication 1014 comprising body elements 1016 that include the body elements 1010 and converted attachment elements 1018. The converted attachment elements 1018 in this example comprise the same attachment element 1012 information, but have been converted to a body element type. The conversion may be implemented as previously described, such as in the case of a MIME or S/MIME communication, or may be implemented in accordance with some other communication standard that differentiates between message body elements and attachment elements.

Furthermore, if a conversion condition 1002 is met, then an associated conversion operation 1003 may be performed on the attachment element 1012 in a manner as previously described. Thus, the outgoing mixed element communication 1008 may be converted into a body element communication 1020 comprising body elements 1022 that include the body elements 1010 and operated attachment elements 1024.

The information in the body elements 1010 and the attachment elements 1012 may also be sent in two communications. The first communication may comprise body elements 1026, which comprise the same information as body elements 1010 in the mixed element communication 1008. A second communication may then comprise converted attachment elements 1028. The converted attachment elements 1028 comprise the same attachment element 1012 information, but have been converted to a body element type. Thus, the outgoing mixed element communication 1008 may be converted into a first body element communication 1026 comprising body elements 1026 that include the body elements 1010, and a second body element communication comprising the converted attachment elements 1028.

The inline generator/extractor 1000 also comprises a table of extraction conditions 1004 and associated extraction operations 1005. The substance of an incoming communication is monitored in a similar manner as described with reference to FIGS. 6 and 8 above. Thus, if an extraction condition 1004 is met, communication data 1036 comprising body information 1038 and attachment information 1040 may be extracted from an incoming body element communication 1030 comprising body elements 1032 and converted attachment elements 1034. The extraction of the body information 1038 and the attachment information 1040 may be implemented as previously described, such as in the case of a MIME or S/MIME communication, or may be implemented in accordance with some other communication standard that differentiates between message body elements and attachment elements. Furthermore, because the attachment information 1040 is extracted from the converted attachments 1034 that are of a body element type, the attachment information 1040 may be automatically utilized by the device receiving the body element communication 1030.

Additionally, if an extraction condition 1004 is met, then an associated extraction operation 1005 may be performed on the converted attachment elements 1034 in a manner as previously described. Thus, communication data 1042 comprising body information 1044 from the body elements 1032 and operated attachment information 1046 resulting from an operation on the converted attachment elements 1034 may be obtained.

Also, the inline generator/extractor module 1000 may be operable to reconstruct the original message 1048 comprising body elements 1050 and attachment elements 1052. The reconstruction of the original message 1048 may be implemented as previously described with reference to conversion information detailing the conversion of the attachment elements 1052 into the converted attachment elements 1034.

In another embodiment, instead of utilizing conversion information to reconstruct the original communication 1048, the original communication 1048 is reconstructed by determining the type of converted attachment elements 1034 and automatically generating appropriate attachment file names and converting the converted attachment elements 1034 back into attachment elements 1052. For example, in the case of an S/MIME communication, the file name extension ".p7m" is associated with the S/MIME token "application/PKCS7-mime." Thus, if a converted attachment element 1034 is associated with the S/MIME token "application/PKCS7-mime," a file name having the extension ".p7m" may be automatically generated and the converted attachment element 1034 can be converted back into attachment element 1052 having the automatically generated file name. Additionally, a similar reconstruction of non-cryptographic attachments can also be implemented. For example, if the content type associated with a converted MIME body part is "image/jpeg," then the inline generator/extractor module 1000 can automatically generate a file name having the extension ".jpg" and the converted attachment element 1052 can be converted back into attachment element 1052 having the automatically generated file name.

This automatic conversion process may also be configurable by file type, e.g., a user of a mobile device 100 may select which converted attachment types are to be automatically reconstructed. For example, the user of the mobile device may desire automatic utilization of cryptographic information, but may not desire the automatic display of other inline entities. Thus, the user may configure the mobile device 22 to automatically convert all inline entities that are not of a cryptographic type into attachments.

Figure 10:
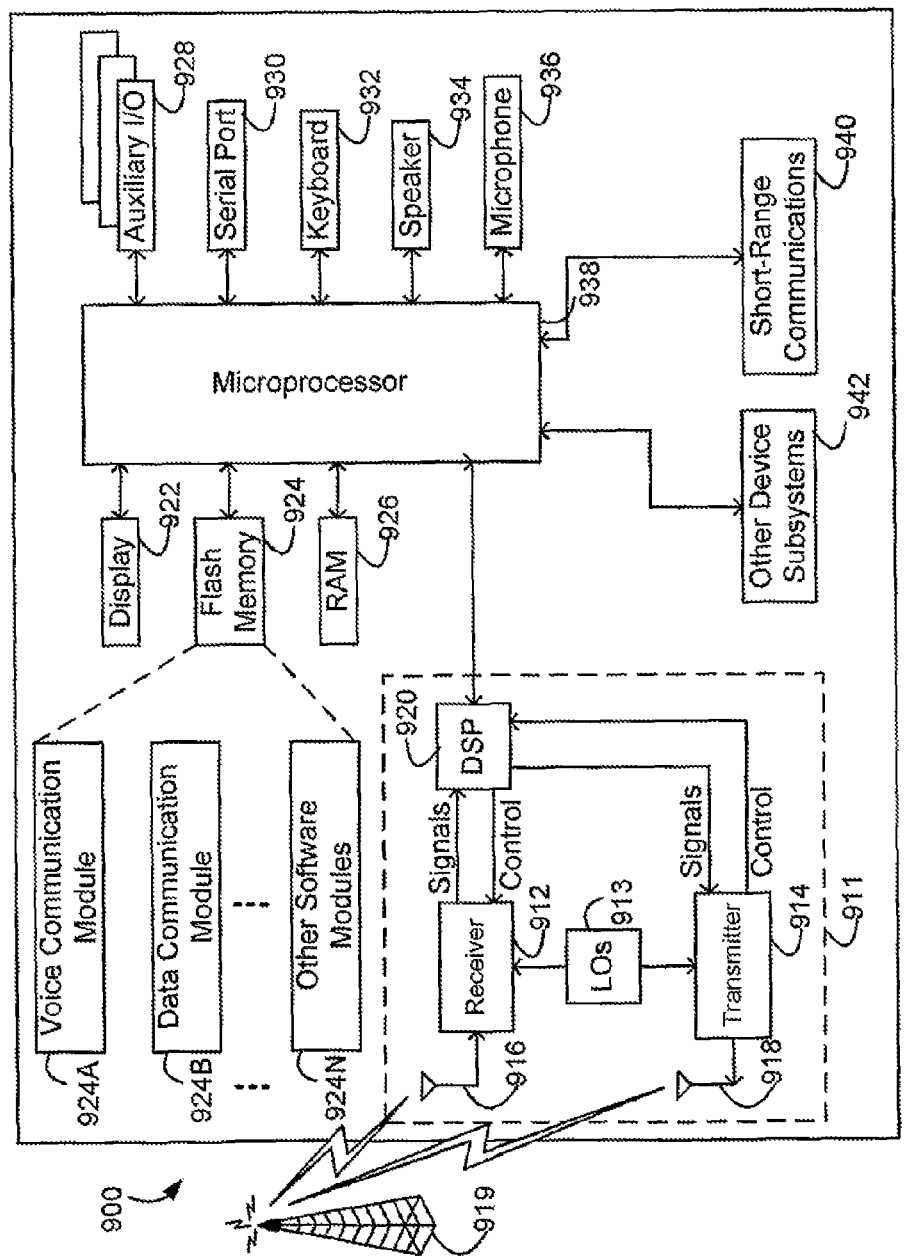
FIG. 10 is a schematic diagram of an exemplary mobile device.

FIG. 10 provides a block diagram of an exemplary wireless device 900 that can be utilized with the systems and methods disclosed herein. The wireless device 900 is preferably a two-way communication device having at least voice and data communication capabilities. The device preferably has the capability to communicate with other computer systems on the Internet. Depending on the functionality provided by the device, the device may be referred to as a data messaging device, a two-way pager, a cellular telephone with data messaging capabilities, a wireless Internet appliance or a data communication device (with or without telephony capabilities).

Where the device 900 is enabled for two-way communications, the device will incorporate a communication subsystem 911, also shown as transceiver 110 in FIG. 6, including a receiver 912, a transmitter 914, and associated components such as one or more, preferably embedded or internal, antenna elements 916 and 918, local oscillators (LOs) 913, and a processing module such as a digital signal processor (DSP) 920. The particular design of the communication subsystem 911 will be dependent upon the communication network in which the device is intended to operate. For example, a device 900 destined for a North American market may include a communication subsystem 911 designed to operate within the Mobitex mobile communication system or DataTAC mobile communication system, whereas a device 900 intended for use in Europe may incorporate a General Packet Radio Service (GPRS) communication subsystem 911.

Network access requirements will also vary depending upon the type of network 919, such as Wireless Network 105 of FIG. 1. For example, in the Mobitex and DataTAC networks, mobile devices such as 900 are registered on the network using a unique personal identification number or PIN associated with each device. In GPRS networks, however, network access is associated with a subscriber or user of a device 900. A GPRS device, therefore, requires a subscriber identity module, commonly referred to as a SIM card, in order to operate on a GPRS network. Without a SIM card, a GPRS device will not be fully functional. Local or non-network communication functions (if any) may be operable, but the device 900 will be unable to carry out any functions involving communications over network 919. When required network registration or activation procedures have been completed, a device 900 may send and receive communication signals over the network 919. Signals received by the antenna 916 through a communication network 919 are input to the receiver 912, which may perform such common receiver functions as signal amplification, frequency down conversion, filtering, channel selection and the like, and in the example system shown in FIG. 10, analog to digital conversion. Analog to digital conversion of a received signal allows more complex communication functions such as demodulation and decoding to be performed in the DSP 920. In a similar manner, signals to be transmitted are processed, including modulation and encoding for example, by the DSP 920 and input to the transmitter 914 for digital to analog conversion, frequency up conversion, filtering, amplification and transmission over the communication network 919 via the antenna 918.

The DSP 920 not only processes communication signals, but also provides for receiver and transmitter control. For example, the gains applied to communication signals in the receiver 912 and transmitter 914 may be adaptively controlled through automatic gain control algorithms implemented in the DSP 920.

The device 900 preferably includes a microprocessor 938, such as processor 320 of FIG. 6, which controls the overall operation of the device. Communication functions, including at least data and voice communications, are performed through the communication subsystem 911. The microprocessor 938 also interacts with further device subsystems such as the display 922, flash memory 924, random access memory (RAM) 926, auxiliary input/output (I/O) subsystems 928, serial port 930, keyboard 932, speaker 934, microphone 936, a short-range communications subsystem 940 and any other device subsystems generally designated as 942.

Some of the subsystems shown in FIG. 10 perform communication-related functions, whereas other subsystems may provide "resident" or on-device functions. Notably, some subsystems, such as keyboard 932 and display 922 for example, may be used for both communication-related functions, such as entering a text message for transmission over a communication network, and device-resident functions such as a calculator or task list.

Operating system software used by the microprocessor 938 is preferably stored in a persistent store such as flash memory 924, which may instead be a read only memory (ROM) or similar storage element. The operating system, specific device applications, or parts thereof, may be temporarily loaded into a volatile store such as RAM 926. Received communication signals may also be stored to RAM 926. Flash memory 924 preferably includes data communication module 924B, and when device 900 is enabled for voice communication, voice communication module 924A. Also included in flash memory 924 are other software modules 924N, such as the inline extractor software module 330 of FIG. 6 and software portions of cryptographic e-mail client 150 of FIG. 4, as well as a cryptographic engine software module.

The microprocessor 938, in addition to its operating system functions, preferably enables execution of software applications on the device 900. A predetermined set of applications which control basic device operations, including at least data and voice communication applications for example, will normally be installed on the device 900 during manufacture. A preferred application that may be loaded onto the device may be a personal information manager (PIM) application having the ability to organize and manage data items relating to the device user such as, but not limited to e-mail, calendar events, voice mails, appointments, and task items. Naturally, one or more memory stores would be available on the device 900 to facilitate storage of PIM data items on the device 900. Such PIM application would preferably have the ability to send and receive data items via the wireless network 105. In a preferred embodiment, the PIM data items are seamlessly integrated, synchronized and updated, via the wireless network 105, with the device user's corresponding data items stored or associated with a host computer system.

Further applications may also be loaded onto the device 900 through the network 919, an auxiliary I/O subsystem 928, serial port 930, short-range communications subsystem 940 or any other suitable subsystem 942, and installed by a user in the RAM 926 or preferably a non-volatile store for execution by the microprocessor 938. Such flexibility in application installation increases the functionality of the device 900 and may provide enhanced on-device functions, communication-related functions, or both. For example, secure communication applications as described herein may enable electronic commerce functions and other such financial transactions to be performed using the device 900.

In a data communication mode, a received signal such as a text message or web page download will be processed by the communication subsystem 911 and input to the microprocessor 938, which will preferably further process the received signal for output to the display 922, or alternatively to an auxiliary I/O device 928. A user of device 900 may also compose data items such as e-mail messages for example, using the keyboard 932, which is preferably a complete alphanumeric keyboard or telephone-type keypad, in conjunction with the display 922 and possibly an auxiliary I/O device 928. Such composed items may then be transmitted over a communication network through the communication subsystem 911.

For voice communications, overall operation of the device 900 is substantially similar, except that received signals would preferably be output to a speaker 934 and signals for transmission would be generated by a microphone 936. Alternative voice or audio I/O subsystems such as a voice message recording subsystem may also be implemented on the device 900. Although voice or audio signal output is preferably accomplished primarily through the speaker 934, the display 922 may also be used to provide an indication of the identity of a calling party, the duration of a voice call, or other voice call related information for example.

The serial port 930 would normally be implemented in a personal digital assistant (PDA)-type communication device for which synchronization with a user's desktop computer may be desirable, but is an optional device component. Such a port 930 would enable a user to set preferences through an external device or software application and would extend the capabilities of the device by providing for information or software downloads to the device 900 other than through a wireless communication network. The alternate download path may for example be used to load an encryption key onto the device 900 through a direct and thus reliable and trusted connection to thereby enable secure device communication.

A short-range communications subsystem 940 is a further optional component which may provide for communication between the device 900 and different systems or devices, which need not necessarily be similar devices. For example, the subsystem 940 may include an infrared device and associated circuits and components or a Bluetooth™ communication module to provide for communication with similarly-enabled systems and devices.

Figure 11:
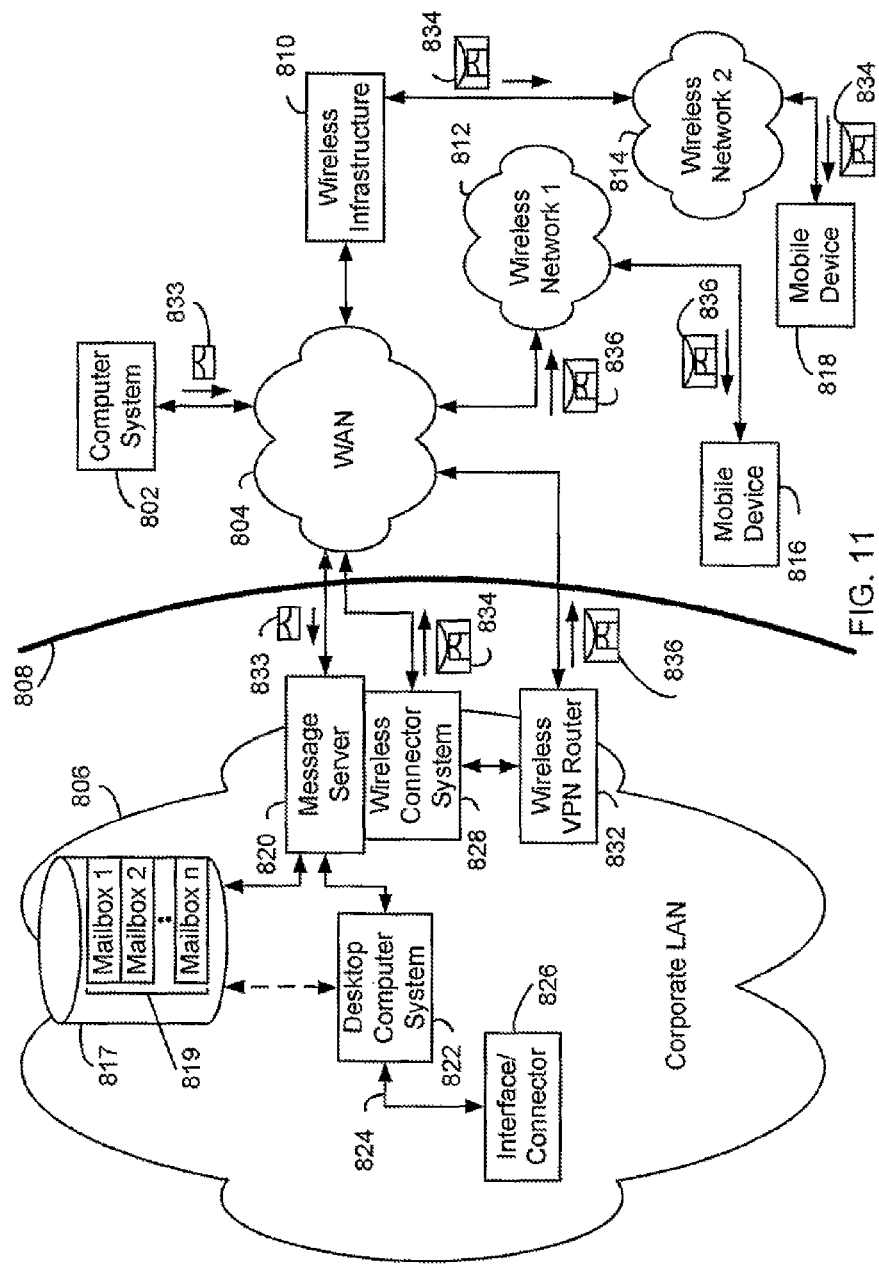
FIG. 11 is a block diagram showing an example communication system in which the cryptographic information system and method may be used.
Figure 12:
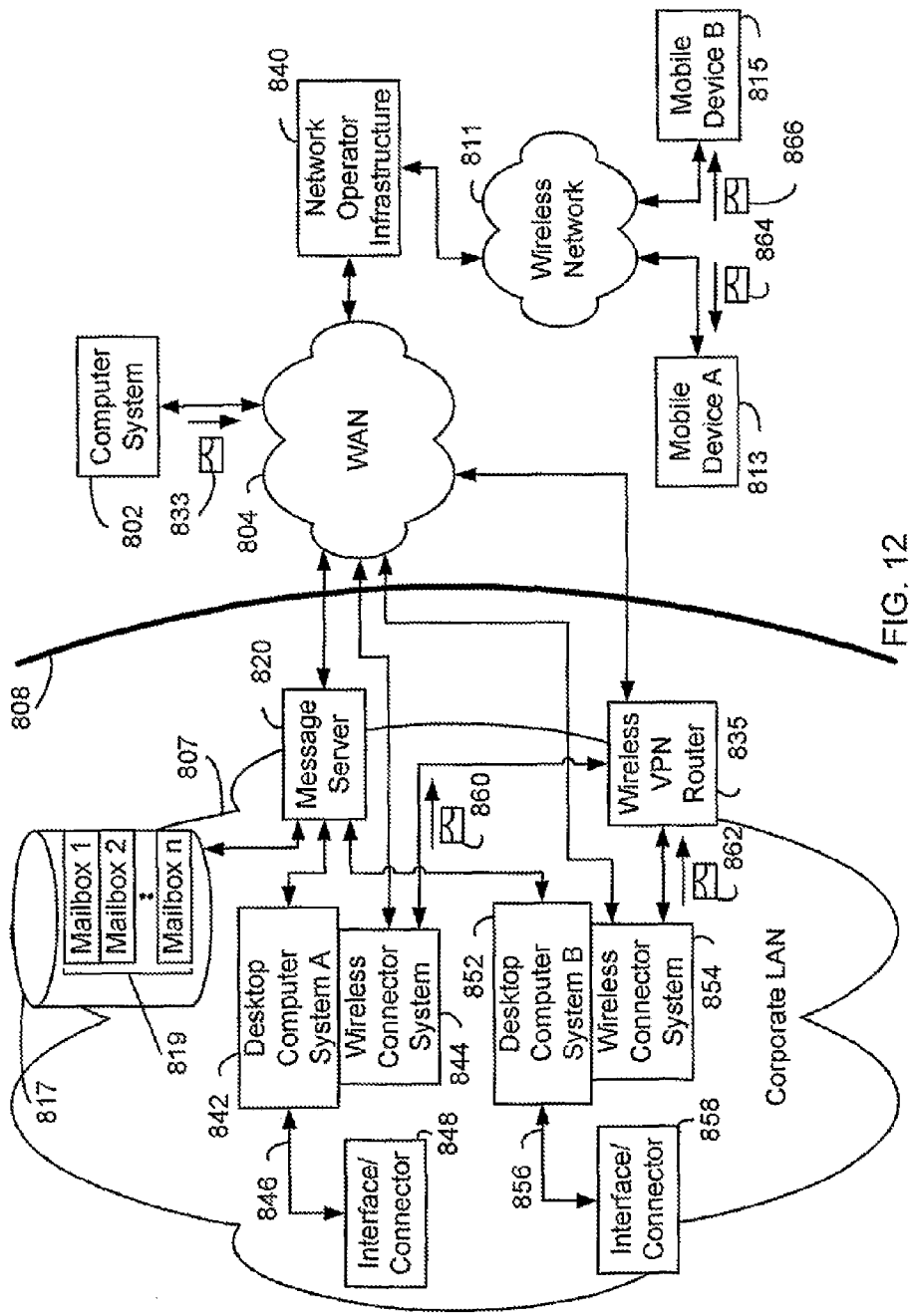
FIG. 12 is a block diagram of an alternative example communication system in which the cryptographic information system and method may be used.
Figure 13:
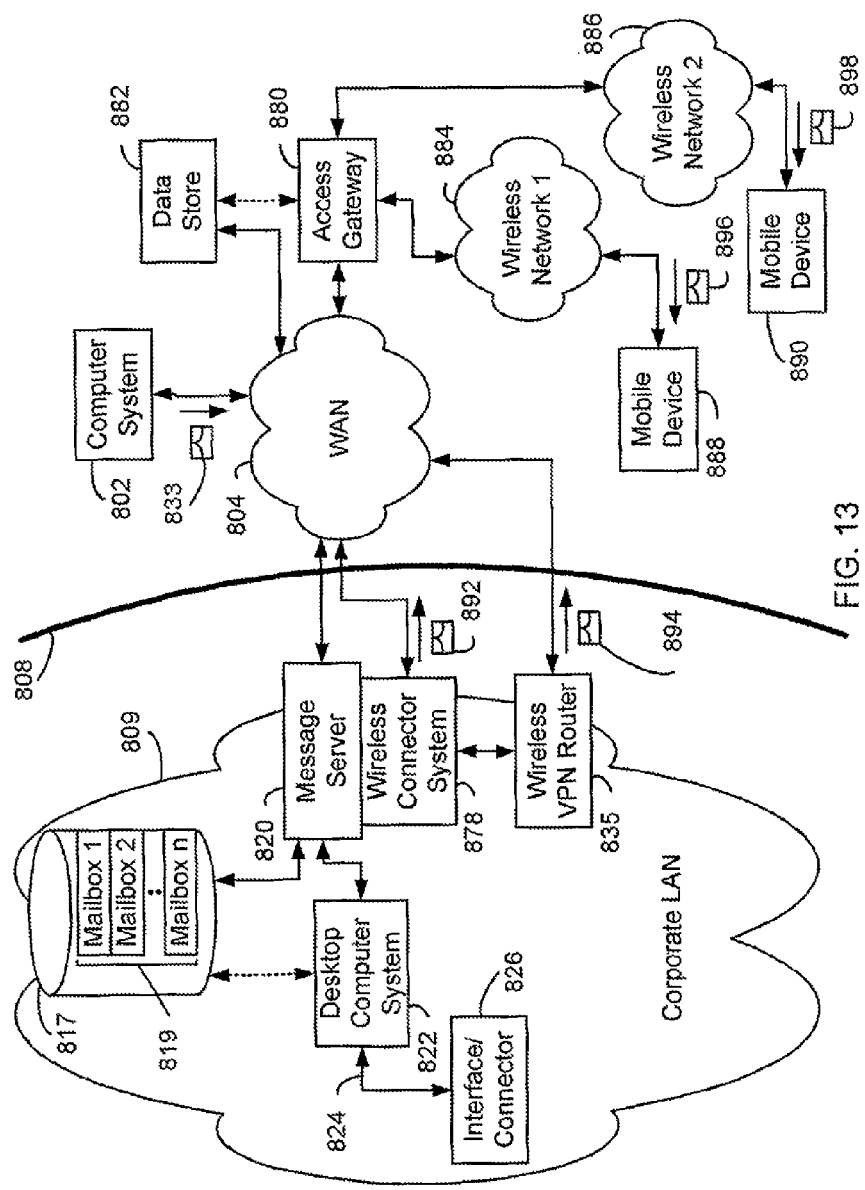
FIG. 13 is a block diagram of another alternative communication system in which the cryptographic information system and method may be used.

FIGS. 11-13 describe additional communication systems in which the systems and methods disclosed herein may be used. FIG. 11 is a block diagram showing an example communication system. In FIG. 11, there is shown a computer system 802, a WAN 804, corporate LAN 806 behind a security firewall 808, wireless infrastructure 810, wireless networks 812 and 814, and mobile devices 816 and 818. The corporate LAN 806 includes a message server 820, a wireless connector system 828, a data store 817 including at least a plurality of mailboxes 819, a desktop computer system 822 having a communication link directly to a mobile device such as through physical connection 824 to an interface or connector 826, and a wireless VPN router 832. Operation of the system in FIG. 11 will be described below with reference to the messages 833, 834 and 836.

The computer system 802 may, for example, be a laptop, desktop or palmtop computer system configured for connection to the WAN 804. Such a computer system may connect to the WAN 804 via an ISP or ASP. Alternatively, the computer system 802 may be a network-connected computer system that, like the computer system 822 for example, accesses the WAN 804 through a LAN or other network. Many modern mobile devices are enabled for connection to a WAN through various infrastructure and gateway arrangements, so that the computer system 802 may also be a mobile device.

The corporate LAN 806 is an illustrative example of a central, server-based messaging system that has been enabled for wireless communications. The corporate LAN 806 may be referred to as a "host system", in that it hosts both a data store 817 with mailboxes 819 for messages, as well as possibly further data stores for other data items, that may be sent to or received from mobile devices 816 and 818, and the wireless connector system 828, the wireless VPN router 832, or possibly other components enabling communications between the corporate LAN 806 and one or more mobile devices 816 and 818. In more general terms, a host system may be one or more computers at, with or in association with which a wireless connector system is operating. The corporate LAN 806 is one preferred embodiment of a host system, in which the host system is a server computer running within a corporate network environment operating behind and protected by at least one security communications firewall 808. Other possible central host systems include ISP, ASP and other service provider or mail systems. Although the desktop computer system 824 and interface/connector 826 may be located outside such host systems, wireless communication operations may be similar to those described below.

The corporate LAN 806 implements the wireless connector system 828 as an associated wireless communications enabling component, which will normally be a software program, a software application, or a software component built to work with at least one or more message server. The wireless connector system 828 is used to send user-selected information to, and to receive information from, one or more mobile devices 816 and 818, via one or more wireless networks 812 and 814. The wireless connector system 828 may be a separate component of a messaging system, as shown in FIG. 11, or may instead be partially or entirely incorporated into other communication system components. For example, the message server 820 may incorporate a software program, application, or component implementing the wireless connector system 828, portions thereof, or some or all of its functionality.

The message server 820, running on a computer behind the firewall 808, acts as the main interface for the corporation to exchange messages, including for example electronic mail, calendaring data, voice mail, electronic documents, and other PIM data with the WAN 804, which will typically be the Internet. The particular intermediate operations and computers will be dependent upon the specific type of message delivery mechanisms and networks via which messages are exchanged, and therefore have not been shown in FIG. 11. The functionality of the message server 820 may extend beyond message sending and receiving, providing such features as dynamic database storage for data like calendars, to-do lists, task lists, e-mail and documentation, as described above.

Message servers such as 820 normally maintain a plurality of mailboxes 819 in one or more data stores such as 817 for each user having an account on the server. The data store 817 includes mailboxes 819 for a number of ("n") user accounts. Messages received by the message server 820 that identify a user, a user account, a mailbox, or possibly another address associated with a user, account or mailbox 819 as a message recipient will typically be stored in the corresponding mailbox 819. If a message is addressed to multiple recipients or a distribution list, then copies of the same message may be stored to more than one mailbox 819. Alternatively, the message server 820 may store a single copy of such a message in a data store accessible to all of the users having an account on the message server, and store a pointer or other identifier in each recipient's mailbox 819. In typical messaging systems, each user may then access his or her mailbox 819 and its contents using a messaging client such as Microsoft Outlook or Lotus Notes, which normally operates on a PC, such as the desktop computer system 822, connected in the LAN 806. Although only one desktop computer system 822 is shown in FIG. 11, a LAN will typically contain many desktop, notebook and laptop computer systems. Each messaging client normally accesses a mailbox 819 through the message server 820, although in some systems, a messaging client may enable direct access to the data store 817 and a mailbox 819 stored thereon by the desktop computer system 822. Messages may also be downloaded from the data store 817 to a local data store on the desktop computer system 822.

Within the corporate LAN 806, the wireless connector system 828 operates in conjunction with the message server 820. The wireless connector system 828 may reside on the same computer system as the message server 820, or may instead be implemented on a different computer system. Software implementing the wireless connector system 828 may also be partially or entirely integrated with the message server 820. The wireless connector system 828 and the message server 820 are preferably designed to cooperate and interact to allow the pushing of information to mobile devices 816, 818. In such an installation, the wireless connector system 828 is preferably configured to send information that is stored in one or more data stores associated with the corporate LAN 806 to one or more mobile devices 816, 818, through the corporate firewall 808 and via the WAN 804 and one of the wireless networks 812, 814. For example, a user that has an account and associated mailbox 819 in the data store 817 may also have a mobile device, such as 816. As described above, messages received by the message server 820 that identify a user, account or mailbox 819 are stored to a corresponding mailbox 819 by the message server 820. If a user has a mobile device, such as 816, messages received by the message server 820 and stored to the user's mailbox 819 are preferably detected by the wireless connector system 828 and sent to the user's mobile device 816. This type of functionality represents a "push" message sending technique. The wireless connector system 828 may instead employ a "pull" technique, in which items stored in a mailbox 819 are sent to a mobile device 816, 818 responsive to a request or access operation made using the mobile device, or some combination of both techniques.

The use of a wireless connector 828 thereby enables a messaging system including a message server 820 to be extended so that each user's mobile device 816, 818 has access to stored messages of the message server 820.

As shown in FIG. 11, there are several paths for exchanging information with a mobile device 816, 818 from the corporate LAN 806. One possible information transfer path is through the physical connection 824 such as a serial port, using an interface or connector 826. This path may be useful for example for bulk information updates often performed at initialization of a mobile device 816, 818 or periodically when a user of a mobile device 816, 818 is working at a computer system in the LAN 806, such as the computer system 822. For example, as described above, PIM data is commonly exchanged over such a connection, for example a serial port connected to an appropriate interface or connector 826 such as a cradle in or upon which a mobile device 816, 818 may be placed. The physical connection 824 may also be used to transfer other information from a desktop computer system 822 to a mobile device 816, 818, including private security keys ("private keys") such as private encryption or signature keys associated with the desktop computer system 822, or other relatively bulky information such as Certs and CRLs, used in some secure messaging schemes such as S/MIME and PGP.

Private key exchange using a physical connection 824 and connector or interface 826 allows a user's desktop computer system 822 and mobile device 816 or 818 to share at least one identity for accessing all encrypted and/or signed mail. The user's desktop computer system 822 and mobile device 816 or 818 can also thereby share private keys so that either the host system 822 or mobile device 816 or 818 can process secure messages addressed to the user's mailbox or account on the message server 820. The transfer of Certs and CRLs over such a physical connection may be desirable in that they represent a large amount of the data that is required for S/MIME, PGP and other public key security methods. A user's own Cert, a chain of Cert(s) used to verify the user's Cert, and CRL, as well as Certs, Cert chains and CRLs for other users, may be loaded onto a mobile device 816, 818 from the user's desktop computer system 822. This loading of other user's Certs and CRLs onto a mobile device 816, 818 allows a mobile device user to select other entities or users with whom they might be exchanging secure messages, and to pre-load the bulky information onto the mobile device through a physical connection instead of over the air, thus saving time and wireless bandwidth when a secure message is received from or to be sent to such other users, or when the status of a Cert is to be determined.

In known "synchronization" type wireless messaging systems, a physical path has also been used to transfer messages from mailboxes 819 associated with a message server 820 to mobile devices 816 and 818.

Another method for data exchange with a mobile device 816, 818 is over-the-air, through the wireless connector system 828 and using wireless networks 812, 814. As shown in FIG. 11, this could involve a Wireless VPN router 832, if available in the network 806, or, alternatively, a traditional WAN connection to wireless infrastructure 810 that provides an interface to one or more wireless networks 812, 814. The Wireless VPN router 832 provides for creation of a VPN connection directly through a specific wireless network 812 to a wireless device 816. Such a Wireless VPN router 832 may be used in conjunction with a static addressing scheme. For example, if the wireless network 812 is an IP-based wireless network, then IPV6 would provide enough IP addresses to dedicate an IP address to every mobile device 816 configured to operate within the network 812 and thus make it possible to push information to a mobile device 816 at any time. A primary advantage of using a wireless VPN router 832 is that it could be an off-the-shelf VPN component which would not require wireless infrastructure 810. A VPN connection may use a TCP/IP or UDP/IP connection to deliver messages directly to and from a mobile device 816.

If a wireless VPN router 832 is not available, then a link to a WAN 804, normally the Internet, is a commonly used connection mechanism that may be employed by the wireless connector system 828. To handle the addressing of the mobile device 816 and any other required interface functions, wireless infrastructure 810 is preferably used. The wireless infrastructure 810 may also determine a most likely wireless network for locating a given user, and track users as they roam between countries or networks. In wireless networks such as 812 and 814, messages are normally delivered to and from mobile devices 816, 818 via RF transmissions between base stations and the mobile devices 816, 818.

A plurality of connections to wireless networks 812 and 814 may be provided, including, for example, ISDN, Frame Relay or T1 connections using the TCP/IP protocol used throughout the Internet. The wireless networks 812 and 814 could represent distinct, unique and unrelated networks, or they could represent the same network in different countries, and may be any of different types of networks, including but not limited to, data-centric wireless networks, voice-centric wireless networks, and dual-mode networks that can support both voice and data communications over the same or similar infrastructure, such as any of those described above.

In some implementations, more than one over-the-air information exchange mechanism may be provided in the corporate LAN 806. In the exemplary communication system of FIG. 11 for example, mobile devices 816, 818 associated with users having mailboxes 819 associated with user accounts on the message server 820 are configured to operate on different wireless networks 812 and 814. If the wireless network 812 supports IPv6 addressing, then the wireless VPN router 832 may be used by the wireless connector system 828 to exchange data with any mobile device 816 operating within the wireless network 812. The wireless network 814 may be a different type of wireless network, however, such as the Mobitex network, in which case information may instead be exchanged with a mobile device 818 operating within the wireless network 814 by the wireless connector system 828 via a connection to the WAN 804 and the wireless infrastructure 810.

Operation of the system in FIG. 11 will now be described using an example of an e-mail message 833 sent from the computer system 802 and addressed to at least one recipient having both an account and mailbox 819 or like data store associated with the message server 820 and a mobile device 816 or 818. However, the e-mail message 833 is intended for illustrative purposes only. The exchange of other types of information between the corporate LAN 806 is preferably also enabled by the wireless connector system 828.

The e-mail message 833, sent from the computer system 802 via the WAN 804, may be fully in the clear, or signed with a digital signature and/or encrypted, depending upon the particular messaging scheme used. For example, if the computer system 802 is enabled for secure messaging using S/MIME, then the e-mail message 833 may be signed, encrypted, or both.

E-mail messages such as 833 normally use traditional SMTP, RFC822 headers and MIME body parts to define the format of the e-mail message. These techniques are all well known to one in the art. The e-mail message 833 arrives at the message server 820, which determines into which mailboxes 819 the e-mail message 833 should be stored. As described above, a message such as the e-mail message 833 may include a user name, a user account, a mailbox identifier, or other type of identifier that may be mapped to a particular account or associated mailbox 819 by the message server 820. For an e-mail message 833, recipients are typically identified using e-mail addresses corresponding to a user account and thus a mailbox 819.

The wireless connector system 828 sends or mirrors, via a wireless network 812 or 814, certain user-selected data items or parts of data items from the corporate LAN 806 to the user's mobile device 816 or 818, preferably upon detecting that one or more triggering events has occurred. A triggering event includes, but is not limited to, one or more of the following: screen saver activation at a user's networked computer system 822, disconnection of the user's mobile device 816 or 818 from the interface 826, or receipt of a command sent from a mobile device 816 or 818 to the host system to start sending one or more messages stored at the host system. Thus, the wireless connector system 828 may detect triggering events associated with the message server 820, such as receipt of a command, or with one or more networked computer systems 822, including the screen saver and disconnection events described above. When wireless access to corporate data for a mobile device 816 or 818 has been activated at the LAN 806, for example when the wireless connector system 828 detects the occurrence of a triggering event for a mobile device user, data items selected by the user are preferably sent to the user's mobile device. In the example of the e-mail message 833, assuming that a triggering event has been detected, the arrival of the message 833 at the message server 820 is detected by the wireless connector system 828. This may be accomplished, for example, by monitoring or querying mailboxes 819 associated with the message server 820, or, if the message server 820 is a Microsoft Exchange server, then the wireless connector system 828 may register for advise syncs provided by the Microsoft Messaging Application Programming Interface (MAPI) to thereby receive notifications when a new message is stored to a mailbox 819.

When a data item such as the e-mail message 833 is to be sent to a mobile device 816 or 818, the wireless connector system 828 preferably repackages the data item in a manner that is transparent to the mobile device, so that information sent to and received by the mobile device appears similar to the information as stored on and accessible at the host system, LAN 806 in FIG. 11. One preferred repackaging method includes wrapping received messages to be sent via a wireless network 812, 814 in an electronic envelope that corresponds to the wireless network address of the mobile device 816, 818 to which the message is to be sent. Alternatively, other repackaging methods could be used, such as special-purpose TCP/IP wrapping techniques. Such repackaging preferably also results in e-mail messages sent from a mobile device 816 or 818 appearing to come from a corresponding host system account or mailbox 819 even though they are composed and sent from a mobile device. A user of a mobile device 816 or 818 may thereby effectively share a single e-mail address between a host system account or mailbox 819 and the mobile device.

Repackaging of the e-mail message 833 is indicated at 834 and 836. Repackaging techniques may be similar for any available transfer paths or may be dependent upon the particular transfer path, either the wireless infrastructure 810 or the wireless VPN router 832. For example, the e-mail message 833 is preferably compressed and encrypted, either before or after being repackaged at 834, to thereby effectively provide for secure transfer to the mobile device 818. Compression reduces the bandwidth required to send the message, whereas encryption ensures confidentiality of any messages or other information sent to mobile devices 816 and 818. In contrast, messages transferred via a VPN router 832 might only be compressed and not encrypted, since a VPN connection established by the VPN router 832 is inherently secure. Messages are thereby securely sent, via either encryption at the wireless connector system 828, which may be considered a non-standard VPN tunnel or a VPN-like connection for example, or the VPN router 832, to mobile devices 816 and 818. Accessing messages using a mobile device 816 or 818 is thus no less secure than accessing mailboxes at the LAN 806 using the desktop computer system 822.

When a repackaged message 834 or 836 arrives at a mobile device 816 or 818, via the wireless infrastructure 810, or via the wireless VPN router 832, the mobile device 816 or 818 removes the outer electronic envelope from the repackaged message 834 or 836, and performs any required decompression and decryption operations. Messages sent from a mobile device 816 or 818 and addressed to one or more recipients are preferably similarly repackaged, and possibly compressed and encrypted, and sent to a host system such as the LAN 806. The host system may then remove the electronic envelope from the repackaged message, decrypt and decompress the message if desired, and route the message to the addressed recipients.

Another goal of using an outer envelope is to maintain at least some of the addressing information in the original e-mail message 833. Although the outer envelope used to route information to mobile devices 816, 818 is addressed using a network address of one or more mobile devices, the outer envelope preferably encapsulates the entire original e-mail message 833, including at least one address field, possibly in compressed and/or encrypted form. This allows original "To", "From" and "CC" addresses of the e-mail message 833 to be displayed when the outer envelope is removed and the message is displayed on a mobile device 816 or 818. The repackaging also allows reply messages to be delivered to addressed recipients, with the "From" field reflecting an address of the mobile device user's account or mailbox on the host system, when the outer envelope of a repackaged outgoing message sent from a mobile device is removed by the wireless connector system 828. Using the user's account or mailbox address from the mobile device 816 or 818 allows a message sent from a mobile device to appear as though the message originated from the user's mailbox 819 or account at the host system rather than the mobile device.

FIG. 12 is a block diagram of an alternative exemplary communication system, in which wireless communications are enabled by a component associated with an operator of a wireless network. As shown in FIG. 12, the system includes a computer system 802, WAN 804, a corporate LAN 807 located behind a security firewall 808, network operator infrastructure 840, a wireless network 811, and mobile devices 813 and 815. The computer system 802, WAN 804, security firewall 808, message server 820, data store 817, mailboxes 819, and VPN router 835 are substantially the same as the similarly-labelled components in FIG. 11. However, since the VPN router 835 communicates with the network operator infrastructure 840, it need not necessarily be a wireless VPN router in the system of FIG. 12. The network operator infrastructure 840 enables wireless information exchange between the LAN 807 and mobile devices 813, 815, respectively associated with the computer systems 842 and 852 and configured to operate within the wireless network 811. In the LAN 807, a plurality of desktop computer systems 842, 852 are shown, each having a physical connection 846, 856 to an interface or connector 848, 858. A wireless connector system 844, 854 is operating on or in conjunction with each computer system 842, 852.

The wireless connector systems 844, 854 are similar to the wireless connector system 828 described above, in that it enables data items, such as e-mail messages and other items that are stored in mailboxes 819, and possibly data items stored in a local or network data store, to be sent from the LAN 807 to one or more mobile devices 813, 815.

In FIG. 12 however, the network operator infrastructure 840 provides an interface between the mobile devices 813, 815 and the LAN 807. As above, operation of the system shown in FIG. 12 will be described below in the context of an e-mail message as an illustrative example of a data item that may be sent to a mobile device 813, 815.

When an e-mail message 833, addressed to one or more recipients having an account on the message server 820, is received by the message server 820, the message, or possibly a pointer to a single copy of the message stored in a central mailbox or data store, is stored into the mailbox 819 of each such recipient. Once the e-mail message 833 or pointer has been stored to a mailbox 819, it may preferably be accessed using a mobile device 813 or 815. In the example shown in FIG. 12, the e-mail message 833 has been addressed to the mailboxes 819 associated with both desktop computer systems 842 and 852 and thus both mobile devices 813 and 815.

Communication network protocols commonly used in wired networks such as the LAN 807 and/or the WAN 804 may not be suitable or compatible with wireless network communication protocols used within wireless networks such as 811. For example, communication bandwidth, protocol overhead and network latency, which are primary concerns in wireless network communications, are less significant in wired networks, which typically have much higher capacity and speed than wireless networks. Therefore, mobile devices 813 and 815 cannot normally access the data store 817 directly. The network operator infrastructure 840 provides a bridge between the wireless network 811 and the LAN 807.

The network operator infrastructure 840 enables a mobile device 813, 815 to establish a connection to the LAN 807 through the WAN 804, and may, for example, be operated by an operator of the wireless network 811 or a service provider that provides wireless communication service for mobile devices 813 and 815. In a pull-based system, a mobile device 813, 815 may establish a communication session with the network operator infrastructure 840 using a wireless network compatible communication scheme, preferably a secure scheme such as Wireless Transport Layer Security (WTLS) when information should remain confidential, and a wireless web browser such as a Wireless Application Protocol (WAP) browser. A user may then request (through manual selection or pre-selected defaults in the software residing in the mobile device) any or all information, or just new information for example, stored in a mailbox 819 in the data store 817 at the LAN 807. The network operator infrastructure 840 then establishes a connection or session with a wireless connector system 844, 854, using Secure Hypertext Transfer Protocol (HTTPS) for example, if no session has already been established. As above, a session between the network operator infrastructure 840 and a wireless connector system 844, 854 may be made via a typical WAN connection or through the VPN router 835 if available. When time delays between receiving a request from a mobile device 813, 815 and delivering requested information back to the device are to be minimized, the network operator infrastructure 840 and the wireless connector systems 844, 854 may be configured so that a communication connection remains open once established.

In the system of FIG. 12, requests originating from mobile device A 813 and B 815 would be sent to the wireless connector systems 844 and 854, respectively. Upon receiving a request for information from the network operator infrastructure 840, a wireless connector system 844, 854 retrieves requested information from a data store. For the e-mail message 833, the wireless connector system 844, 854 retrieves the e-mail message 833 from the appropriate mailbox 819, typically through a messaging client operating in conjunction with the computer system 842, 852, which may access a mailbox 819 either via the message server 820 or directly. Alternatively, a wireless connector system 844, 854 may be configured to access mailboxes 819 itself, directly or through the message server 820. Also, other data stores, both network data stores similar to the data store 817 and local data stores associated with each computer system 842, 852, may be accessible to a wireless connector system 844, 854, and thus to a mobile device 813, 815.

If the e-mail message 833 is addressed to the message server accounts or mailboxes 819 associated with both computer systems 842 and 852 and devices 813 and 815, then the e-mail message 833 may be sent to the network operator infrastructure 840 as shown at 860 and 862, which then sends a copy of the e-mail message to each mobile device 813 and 815, as indicated at 864 and 866. Information may be transferred between the wireless connector systems 844, 854 and the network operator infrastructure 840 via either a connection to the WAN 804 or the VPN router 835. When the network operator infrastructure 840 communicates with the wireless connector systems 844, 854 and the mobile devices 813, 815 via different protocols, translation operations may be performed by the network operator infrastructure 840. Repackaging techniques may also be used between the wireless connector systems 844, 854 and the network operator infrastructure 840, and between each mobile device 813, 815 and the network operator infrastructure 840.

Messages or other information to be sent from a mobile device 813, 815 may be processed in a similar manner, with such information first being transferred from a mobile device 813, 815 to the network operator infrastructure 840. The network operator infrastructure 840 may then send the information to a wireless connector system 844, 854 for storage in a mailbox 819 and delivery to any addressed recipients by the message server 820 for example, or may alternatively deliver the information to the addressed recipients.

The above description of the system in FIG. 12 relates to pull-based operations. The wireless connector systems 844, 854 and the network operator infrastructure may instead be configured to push data items to mobile devices 813 and 815. A combined push/pull system is also possible. For example, a notification of a new message or a list of data items currently stored in a data store at the LAN 807 could be pushed to a mobile device 813, 815, which may then be used to request messages or data items from the LAN 807 via the network operator infrastructure 840.

If mobile devices associated with user accounts on the LAN 807 are configured to operate within different wireless networks, then each wireless network may have an associated wireless network infrastructure component similar to 840.

Although separate, dedicated wireless connector systems 844, 854 are shown for each computer system 842, 852 in the system of FIG. 12, one or more of the wireless connector systems 844, 854 may preferably be configured to operate in conjunction with more than one computer system 842, 852, or to access a data store or mailbox 819 associated with more than one computer system. For example, the wireless connector system 844 may be granted access to the mailboxes 819 associated with both the computer system 842 and the computer system 852. Requests for data items from either mobile device A 813 or B 815 may then be processed by the wireless connector system 844. This configuration may be useful to enable wireless communications between the LAN 807 and the mobile devices 813 and 815 without requiring a desktop computer system 842, 852 to be running for each mobile device user. A wireless connector system may instead be implemented in conjunction with the message server 820 to enable wireless communications.

FIG. 13 is a block diagram of another alternative communication system. The system includes a computer system 802, WAN 804, a corporate LAN 809 located behind a security firewall 808, an access gateway 880, data store 882, wireless networks 884 and 886, and mobile devices 888 and 890. In the LAN 809, the computer system 802, WAN 804, security firewall 808, message server 820, data store 817, mailboxes 819, desktop computer system 822, physical connection 824, interface or connector 826 and VPN router 835 are substantially the same as the corresponding components described above. The access gateway 880 and data store 882 provide mobile devices 888 and 890 with access to data items stored at the LAN 809. In FIG. 13, a wireless connector system 878 operates on or in conjunction with the message server 820, although a wireless connector system may instead operate on or in conjunction with one or more desktop computer systems in the LAN 809.

The wireless connector system 878 provides for transfer of data items stored at the LAN 809 to one or more mobile devices 888, 890. These data items preferably include e-mail messages stored in mailboxes 819 in the data store 817, as well as possibly other items stored in the data store 817 or another network data store or a local data store of a computer system such as 822.

As described above, an e-mail message 833 addressed to one or more recipients having an account on the message server 820 and received by the message server 820 may be stored into the mailbox 819 of each such recipient. In the system of FIG. 13, the external data store 882 preferably has a similar structure to, and remains synchronized with, the data store 817. PIM information or data stored at data store 882 preferably is independently modifiable to the PIM information or data stored at the host system. In this particular configuration, the independently modifiable information at the external data store 882 may maintain synchronization of a plurality of data stores associated with a user (i.e., data on a mobile device, data on a personal computer at home, data at the corporate LAN, etc.). This synchronization may be accomplished, for example, through updates sent to the data store 882 by the wireless connector system 878 at certain time intervals, each time an entry in the data store 817 is added or changed, at certain times of day, or when initiated at the LAN 809, by the message server 820 or a computer system 822, at the data store 882, or possibly by a mobile device 888, 890 through the access gateway 880. In the case of the e-mail message 833 for example, an update sent to the data store 882 some time after the e-mail message 833 is received may indicate that the message 833 has been stored in a certain mailbox 819 in the store 817, and a copy of the e-mail message will be stored to a corresponding storage area in the data store 882. When the e-mail message 833 has been stored in the mailboxes 819 corresponding to the mobile devices 888 and 890 for example, one or more copies of the e-mail message, indicated at 892 and 894 in FIG. 13, will be sent to and stored in corresponding storage areas or mailboxes in the data store 882. As shown, updates or copies of stored information in the data store 817 may be sent to the data store 882 via a connection to the WAN 804 or the VPN router 835. For example, the wireless connector system 878 may post updates or stored information to a resource in the data store 882 via an HTTP post request. Alternatively, a secure protocol such as HTTPS or Secure Sockets Layer (SSL) may be used. A single copy of a data item stored in more than one location in a data store at the LAN 809 may instead be sent to the data store 882. This copy of the data item could then be stored either in more than one corresponding location in the data store 882, or a single copy may be stored in the data store 882, with a pointer or other identifier of the stored data item being stored in each corresponding location in the data store 882.

The access gateway 880 is effectively an access platform, in that it provides mobile devices 888 and 890 with access to the data store 882. The data store 882 may be configured as a resource accessible on the WAN 804, and the access gateway 880 may be an ISP system or WAP gateway through which mobile devices 888 and 890 may connect to the WAN 804. A WAP browser or other browser compatible with the wireless networks 884 and 886 may then be used to access the data store 882, which is synchronized with the data store 817, and download stored data items either automatically or responsive to a request from a mobile device 888, 890. As shown at 896 and 898, copies of the e-mail message 833, which was stored in the data store 817, may be sent to the mobile devices 888 and 890. A data store on each mobile device 888, 890 may thereby be synchronized with a portion, such as a mailbox 819, of a data store 817 on a corporate LAN 809. Changes to a mobile device data store may similarly be reflected in the data stores 882 and 817.

The embodiments described herein are examples of structures, systems, or methods having elements corresponding to the elements of the invention recited in the claims. This written description may enable those of ordinary skill in the art to make and use embodiments having alternative elements that likewise correspond to the elements of the invention recited in the claims. The intended scope of the invention thus includes other structures, systems or methods that do not differ from the literal language of the claims, and further includes other structures, systems or methods with insubstantial differences from the literal language of the claims.

What is claimed is:

1. A system for converting attachment information into an inline form in a communication to a mobile device, the system comprising:

a memory subsystem configured to store data;
a processor coupled to the memory subsystem and configured to read data from the memory subsystem; and
an inline generator software module stored in the memory subsystem and executable by the processor,
the inline generator software module being operable to access an extractor data structure comprising one or more conversion conditions associated with one or more attachment element types, each of the conversion conditions defining a conversion criterion for an associated attachment element type,
the inline generator software module also being operable to convert the attachment information into a body element of the communication upon the occurrence of an associated conversion condition associated with an attachment element type of an attachment element comprising the attachment information, the inline generator software module being adapted to:
determine if the communication comprises cryptographic information;
upon determining that the communication comprises cryptographic information, access the extractor data structure to determine if an associated conversion condition has been met; and
upon determining that an associated conversion condition has been met, change a content disposition of the communication from an attachment type to an inline type to create an inline cryptographic entity.

2. The system of claim 1, wherein the inline generator software module is further operable to select a subset of the cryptographic information and include the subset of the cryptographic information in the inline cryptographic entity.

3. The system of claim 2, wherein the cryptographic information is a digital certificate, and wherein the subset of the cryptographic information is a public key.

4. The system of claim 1, wherein:
the extractor data structure further comprises a pre-conversion operation associated with the one or more conversion conditions; and
the inline generator software module is further operable to execute the pre-conversion operation on the attachment element upon the occurrence of an associated conversion condition.

5. The system of claim 4, wherein the inline generator software module is further operable to append conversion information to the communication, the conversion information detailing the conversion of the attachment element of an attachment element type into the body element upon the occurrence of an associated conversion condition.

6. The system of claim 1, wherein the system further comprises the mobile device.

7. The system of claim 1, wherein the communication comprises a Secure Multipurpose Internet Mail Extensions (S/MIME) message.

8. A method of converting attachment information into an inline form in a communication to a mobile device, the method comprising:
accessing an extractor data structure comprising one or more conversion conditions associated with one or more attachment element types, each of the conversion conditions defining a conversion criterion for an associated attachment element type;
converting the attachment information into a body element of the communication upon the occurrence of an associated conversion condition associated with an attachment element type of an attachment element comprising the attachment information;

determining if the communication comprises cryptographic information;

upon determining that the communication comprises cryptographic information, accessing the extractor data structure to determine if an associated conversion condition has been met; and upon determining that an associated conversion condition has been met, changing a content disposition of the communication from an attachment type to an inline type to create an inline cryptographic entity.

9. The method of claim 8, wherein the extractor data structure further comprises a pre-conversion operation associated with the one or more conversion conditions; and wherein the method further comprises executing the pre-conversion operation on the attachment element upon the occurrence of an associated conversion condition.

10. The method of claim 9, wherein the inline generator software module is further operable to append conversion information to the communication, the conversion information detailing the conversion of the attachment element of an attachment element type into the body element upon the occurrence of an associated conversion condition.

11. The method of claim 8, further comprising:
selecting a subset of the cryptographic information; and
including the subset of the cryptographic information in the inline cryptographic entity.

12. The method of claim 11, wherein the cryptographic information is a digital certificate, and wherein the subset of the cryptographic information is a public key.

13. The method of claim 8, wherein the communication comprises a Secure Multipurpose Internet Mail Extensions (S/MIME) message.

14. A non-transitory computer-readable medium storing statements and instructions for execution by a processor to perform operations comprising:
accessing an extractor data structure comprising one or more conversion conditions associated with one or more attachment element types, each of the conversion conditions defining a conversion criterion for an associated attachment element type;
converting the attachment information into a body element of the communication upon the occurrence of an associated conversion condition associated with an attachment element type of an attachment element comprising the attachment information;
determining if the communication comprises cryptographic information;
upon determining that the communication comprises cryptographic information, accessing the extractor data structure to determine if an associated conversion condition has been met; and
upon determining that an associated conversion condition has been met, changing a content disposition of the communication from an attachment type to an inline type to create an inline cryptographic entity.

15. The computer-readable medium of claim 14, wherein the extractor data structure further comprises a pre-conversion operation associated with the one or more conversion conditions; and wherein the method further comprises executing the pre-conversion operation on the attachment element upon the occurrence of an associated conversion condition.

16. The computer-readable medium of claim 15, wherein the inline generator software module is further operable to append conversion information to the communication, the conversion information detailing the conversion of the attachment element of an attachment element type into the body element upon the occurrence of an associated conversion condition.

17. The computer-readable medium of claim 14, further comprising:
selecting a subset of the cryptographic information; and
including the subset of the cryptographic information in the inline cryptographic entity.

18. The computer-readable medium of claim 17, wherein the cryptographic information is a digital certificate, and wherein the subset of the cryptographic information is a public key.

19. The computer-readable medium of claim 14, wherein the communication comprises a Secure Multipurpose Internet Mail Extensions (S/MIME) message.

* * * * *